US012204558B2

(12) United States Patent
Colrain et al.

(10) Patent No.: US 12,204,558 B2
(45) Date of Patent: Jan. 21, 2025

(54) FAILOVER OF DATABASE SESSIONS TO A LOGICAL REPLICA DATABASE

(71) Applicant: Oracle International Corporation, Redwood Shores, CA (US)

(72) Inventors: Carol Lyndall Colrain, Kansas City, KS (US); Xiaoli Qi, Palo Alto, CA (US); Kevin S. Neel, San Mateo, CA (US); Stephen J. Vivian, Londonderry, NH (US); Michael Cusson, Woburn, MA (US); Yunrui Li, Los Altos, CA (US); Jonathan Giloni, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/379,684

(22) Filed: Oct. 13, 2023

(65) Prior Publication Data

US 2024/0126785 A1    Apr. 18, 2024

Related U.S. Application Data

(60) Provisional application No. 63/416,136, filed on Oct. 14, 2022.

(51) Int. Cl.
*G06F 16/27*  (2019.01)
*G06F 11/20*  (2006.01)
(Continued)

(52) U.S. Cl.
CPC ........ *G06F 16/275* (2019.01); *G06F 11/2023* (2013.01); *G06F 16/2322* (2019.01);
(Continued)

(58) Field of Classification Search
CPC .............. G06F 16/275; G06F 16/2322; G06F 16/2379; G06F 16/2455; G06F 11/2023; G06F 2201/80
See application file for complete search history.

(56) References Cited

U.S. PATENT DOCUMENTS 5,680,610 A   10/1997  Smith et al.
5,835,724 A   11/1998  Smith
(Continued)

FOREIGN PATENT DOCUMENTS

WO   WO 2004/040399 A2   5/2004
WO   WO2008/051855       5/2008

OTHER PUBLICATIONS

PCT/US2012/054326, Claims, 4 pages.
(Continued)

*Primary Examiner* — William Spieler
(74) *Attorney, Agent, or Firm* — Hickman Becker Bingham Ledesma LLP

(57) ABSTRACT

Techniques are described for preserving the inflight sessions failing over from a primary database to the replicated logical database of the primary database. In an implementation, prior to failover, when the primary database server receives a commit for a transaction, the process stores a commit indication that the transaction has been committed by performing a corresponding SQL command. The commit indication is replicated to the logical replica database by virtue of the replication of the SQL command and its execution on the logical replica database. Accordingly, the standby database server in the failover session may successfully request for the outcome of the transaction. Techniques are also described for the client-side LOB references to be preserved when failing over to the logical replica database, for AS OF
(Continued)

queries preserved, and for versioning of checksums, signatures and structures across logical replicas.

20 Claims, 8 Drawing Sheets

(51) Int. Cl.
    *G06F 16/23*     (2019.01)
    *G06F 16/2455*     (2019.01)
(52) U.S. Cl.
    CPC ...... *G06F 16/2379* (2019.01); *G06F 16/2455* (2019.01); *G06F 2201/80* (2013.01)

(56) References Cited

U.S. PATENT DOCUMENTS

| | | |
|---|---|---|
| 5,907,848 A | 5/1999 | Zaiken |
| 5,913,029 A | 6/1999 | Shostak |
| 6,041,357 A | 3/2000 | Kunzelman et al. |
| 6,442,552 B1 | 8/2002 | Frolund et al. |
| 6,460,043 B1 | 10/2002 | Tabbara et al. |
| 6,622,119 B1 | 9/2003 | Ramaswamy et al. |
| 6,728,747 B1 | 4/2004 | Jenkins et al. |
| 6,868,445 B1 | 3/2005 | Chebrolu |
| 7,290,056 B1 | 10/2007 | McLaughlin, Jr. |
| 7,328,268 B1 | 2/2008 | Foltak |
| 7,346,690 B1 | 3/2008 | Sinha et al. |
| 7,366,755 B1 | 4/2008 | Cuomo et al. |
| 7,415,470 B2 | 8/2008 | Kasamsetty et al. |
| 7,502,824 B2 | 3/2009 | Kaluskar et al. |
| 7,536,462 B2 | 5/2009 | Pandya |
| 7,539,746 B2 | 5/2009 | Bankier et al. |
| 7,552,218 B2 | 6/2009 | Kaluskar |
| 7,631,107 B2 | 12/2009 | Pandya |
| 7,634,512 B2 | 12/2009 | Cao et al. |
| 7,747,754 B2 | 6/2010 | Kalaukar et al. |
| 7,761,435 B2 | 7/2010 | Stanev |
| 7,849,173 B1 | 12/2010 | Uhlik |
| 7,849,177 B2 | 12/2010 | Uhlik |
| 7,853,698 B2 | 12/2010 | Stanev et al. |
| 7,890,457 B2 | 2/2011 | Dias et al. |
| 7,890,458 B2 | 2/2011 | Dias et al. |
| 8,005,966 B2 | 8/2011 | Pandya |
| 8,024,299 B2 | 9/2011 | Dias et al. |
| 8,612,614 B2 | 12/2013 | Jagannath et al. |
| 8,918,525 B2 | 12/2014 | Banes |
| 9,094,299 B1 | 7/2015 | Rao |
| 10,374,924 B1 | 8/2019 | Holland et al. |
| 2002/0143846 A1 | 10/2002 | Montero et al. |
| 2003/0028654 A1 | 2/2003 | Abjanic et al. |
| 2003/0131045 A1 | 7/2003 | McGee et al. |
| 2003/0204769 A1 | 10/2003 | Coughlin |
| 2004/0015600 A1 | 1/2004 | Tiwary et al. |
| 2004/0193583 A1* | 9/2004 | Suzuki ............... G06F 11/1474 |
| 2004/0210500 A1 | 10/2004 | Sobel et al. |
| 2005/0021514 A1 | 1/2005 | Barga et al. |
| 2005/0038848 A1 | 2/2005 | Kaluskar et al. |
| 2005/0102261 A1 | 5/2005 | Todd |
| 2005/0131879 A1 | 6/2005 | Ghosh et al. |
| 2005/0186975 A1 | 8/2005 | Yach et al. |
| 2006/0036617 A1 | 2/2006 | Bastawala et al. |
| 2006/0129684 A1 | 6/2006 | Datta |
| 2006/0248036 A1 | 11/2006 | Stanev et al. |
| 2006/0282422 A1 | 12/2006 | Al-Omari |
| 2007/0067266 A1 | 3/2007 | Lomet |
| 2007/0147247 A1 | 6/2007 | Kalonji et al. |
| 2007/0180122 A1 | 8/2007 | Barrett |
| 2007/0226218 A1 | 9/2007 | Chatterjee et al. |
| 2007/0260714 A1 | 11/2007 | Kalmuk et al. |
| 2008/0010240 A1 | 1/2008 | Zait |
| 2008/0046462 A1 | 2/2008 | Kaufman et al. |
| 2008/0097960 A1 | 4/2008 | Dias et al. |
| 2008/0097961 A1 | 4/2008 | Dias et al. |
| 2008/0097995 A1 | 4/2008 | Dias et al. |
| 2008/0097996 A1 | 4/2008 | Dias et al. |
| 2008/0098003 A1 | 4/2008 | Dias et al. |
| 2008/0098048 A1 | 4/2008 | Cao et al. |
| 2008/0134219 A1 | 6/2008 | Dorrance et al. |
| 2008/0228834 A1 | 9/2008 | Burchall et al. |
| 2008/0281846 A1 | 11/2008 | Hoang et al. |
| 2008/0285945 A1 | 11/2008 | Rajakarunanayake |
| 2009/0043778 A1 | 2/2009 | Jambunathan |
| 2009/0077135 A1 | 3/2009 | Yalamanchi et al. |
| 2009/0100082 A1 | 4/2009 | Kogan et al. |
| 2009/0132536 A1 | 5/2009 | Brown et al. |
| 2009/0144546 A1 | 6/2009 | Jancula et al. |
| 2010/0005097 A1 | 1/2010 | Liang |
| 2010/0030818 A1 | 2/2010 | Cooper et al. |
| 2010/0036957 A1 | 2/2010 | Patel |
| 2010/0042601 A1 | 2/2010 | Kelley et al. |
| 2010/0071043 A1 | 3/2010 | Babula et al. |
| 2010/0293137 A1 | 11/2010 | Zuckerman et al. |
| 2010/0318394 A1 | 12/2010 | Nayak et al. |
| 2011/0191303 A1 | 8/2011 | Kaufman et al. |
| 2011/0212783 A1 | 9/2011 | Dale |
| 2011/0218981 A1 | 9/2011 | Retnakumari et al. |
| 2011/0246419 A1 | 10/2011 | Yancey |
| 2011/0276550 A1 | 11/2011 | Colle et al. |
| 2012/0179645 A1 | 7/2012 | Lomet et al. |
| 2013/0066837 A1 | 3/2013 | Colrain |
| 2013/0066948 A1 | 3/2013 | Colrain |
| 2013/0066949 A1 | 3/2013 | Colrain et al. |
| 2013/0066952 A1 | 3/2013 | Colrain |
| 2013/0066955 A1* | 3/2013 | Neel .................. H04L 67/63 |
| | | 709/203 |
| 2013/0097307 A1 | 4/2013 | Vazac |
| 2013/0167211 A1 | 6/2013 | Kamat |
| 2013/0297566 A1 | 11/2013 | Colrain |
| 2014/0095547 A1 | 4/2014 | Guo et al. |
| 2014/0101117 A1 | 4/2014 | Uzzaman |
| 2014/0201838 A1 | 7/2014 | Varsanyi et al. |
| 2014/0229531 A1 | 8/2014 | Neel et al. |
| 2015/0089604 A1 | 3/2015 | Mathew |
| 2015/0180894 A1 | 6/2015 | Sadovsky et al. |
| 2015/0244775 A1 | 8/2015 | Vibhor et al. |
| 2015/0326673 A1 | 11/2015 | Neel et al. |
| 2016/0041882 A1 | 2/2016 | Kruse |
| 2016/0094665 A1 | 3/2016 | Kellmereit et al. |
| 2016/0140178 A1 | 5/2016 | Sirohi et al. |
| 2016/0179420 A1 | 6/2016 | Mei |
| 2016/0328488 A1 | 11/2016 | Lytle |
| 2017/0076342 A1 | 3/2017 | Golec et al. |
| 2017/0116235 A1 | 4/2017 | Yam et al. |
| 2017/0212691 A1 | 7/2017 | Katsuki |
| 2017/0212965 A1 | 7/2017 | Gnech et al. |
| 2017/0220621 A1 | 8/2017 | Colrain et al. |
| 2017/0264624 A1 | 9/2017 | Wan |
| 2017/0289271 A1 | 10/2017 | Seed |
| 2017/0310763 A1 | 10/2017 | Morgan |
| 2017/0322972 A1 | 11/2017 | Lee et al. |
| 2017/0339176 A1 | 11/2017 | Backer |
| 2017/0359353 A1 | 12/2017 | Tan |
| 2018/0013692 A1* | 1/2018 | Park .................. H04L 67/535 |
| 2018/0129688 A1 | 5/2018 | Colrain |
| 2018/0158014 A1 | 6/2018 | Chandra et al. |
| 2018/0246945 A1* | 8/2018 | Lee .................. G06F 11/3476 |
| 2018/0336258 A1* | 11/2018 | Lee .................. G06F 11/36 |
| 2019/0102267 A1 | 4/2019 | Giloni |
| 2019/0102401 A1 | 4/2019 | Neel |
| 2019/0163545 A1 | 5/2019 | Singh et al. |
| 2019/0180757 A1 | 6/2019 | Kothari et al. |
| 2020/0110832 A1 | 4/2020 | Kadyrov et al. |
| 2020/0233749 A1 | 7/2020 | Podal et al. |
| 2020/0244625 A1 | 7/2020 | Tummalapent et al. |
| 2020/0401684 A1 | 12/2020 | Vath et al. |
| 2021/0064573 A1 | 3/2021 | Rao et al. |
| 2021/0081382 A1 | 3/2021 | Colrain |
| 2021/0303572 A1* | 9/2021 | Ouyang ............... H04L 67/125 |
| 2022/0086234 A1 | 3/2022 | Colrain et al. |

(56) References Cited

U.S. PATENT DOCUMENTS

2022/0269694 A1* 8/2022 Burnett ............... G06F 16/2358
2023/0072125 A1* 3/2023 Fu ........................... G06F 16/27

OTHER PUBLICATIONS

PCT/IS2012/054326, ISR WO, dated Jan. 3, 2013, 11 pages.
Liu et al., "Ad-heap: an Efficient Heap Data Structure for Asymmetric Multicore Processors", In Proceedings of Workshop on General Purpose Processing Using GPUs, ACM, dated 2014, 10 pages.
Lamarca et al., "The Influence of Caches on the Performance of Heaps", dated Jan. 1, 1996, 26 pages.
Galanis et al., "Oracle Database Replay," ACM, 2008, pp. 1159-1170 (12 pages).
Furtak et al., "Using SIMD Registers and Instructions to Enable Instruction-Level Parallelism in Sorting Algorithms", ACM Symposium on Parallel Algorithms and Architectures, dated 2007, 10 pages.
D.E. Knuth, "The Art of Computer Programming", vol. 3: 2nd Edition Sorting and Searching, ISBN: 0-201-03803-X, pp. 129-157 from book, dated 1973.
Colle et al., "Oracle Database Replay", ACM, dated 2009, 4 pages.
B. A. Fisch et al., "MalicioClient Security in Blind Seer: A Scalable Private DBMS," 2015 IEEE Symposium on Security and Privacy, 2015, pp. 395-410.
"Database Replay", Oracle White Paper, dated 2007, 19 pages.
"28 Transparent Application Failover", Oracle® Database JDBC Developer's Guide and Reference 10g Release 2 (10.2) Part No. B14355-04 from the Internet on Jul. 25, 2011, dated 1999 (3 pages).
Neel, U.S. Appl. No. 16/147,314, filed Sep. 28, 2018, Patent Board Decision—Examiner Reversed, Jan. 16, 2024.
Neel, U.S. Appl. No. 16/147,314, filed Sep. 28, 2018, Notice of Allowance and Fees Due, Jan. 29, 2024.
Giloni, U.S. Appl. No. 16/147,367, filed Sep. 28, 2018, Advisory Action, Mar. 24, 2021.
Colrain, U.S. Appl. No. 13/542,278, filed Jul. 5, 2012, Office Action, Nov. 23, 2012.
Neel, U.S. Appl. No. 16/147,314, filed Sep. 28, 2018, Pre-Brief Appeal Conference decision, Dec. 23, 2022.
Neel, U.S. Appl. No. 16/147,314, filed Sep. 28, 2018, Final Rejection, Jul. 14, 2022.
Neel, U.S. Appl. No. 16/147,314, filed Sep. 28, 2018, Office Action, Nov. 18, 2021.
Giloni, U.S. Appl. No. 16/147,367, filed Sep. 28, 2018, Interview Summary, Mar. 19, 2021.
Giloni, U.S. Appl. No. 16/147,367, filed Sep. 28, 2018, Final Office Action, Jan. 13, 2021.
Giloni, U.S. Appl. No. 16/147,367, filed Sep. 28, 2018, Notice of Allowance and Fees Due, Aug. 15, 2022.
Neel, U.S. Appl. No. 16/147,314, filed Sep. 28, 2018, Final Office Action, Jan. 13, 2021.
Giloni, U.S. Appl. No. 16/147,367, filed Sep. 28, 2018, Office Action Jul. 9, 2020.
Neel, U.S. Appl. No. 16/147,314, filed Sep. 28, 2018, Advisory Action, Mar. 24, 2021.
Colrain, U.S. Appl. No. 17/018,181, filed Sep. 11, 2020, Notice of Allowance and Fees Due, Oct. 18, 2023.
Colrain, U.S. Appl. No. 17/018,181, filed Sep. 11, 2020, Non-Final Rejection, Dec. 1, 2021.
Colrain, U.S. Appl. No. 17/018,181, filed Sep. 11, 2020, Final Rejection, Jun. 10, 2022.
Colrain, U.S. Appl. No. 17/018,181, filed Sep. 11, 2020, Advisory Action, Aug. 31, 2022.
Colrain, U.S. Appl. No. 17/018,142, filed Sep. 11, 2020, Notice of Allowance and Fees Due, Feb. 6, 2023.
Colrain, U.S. Appl. No. 17/018,142, filed Sep. 11, 2020, Non-Final Rejection, Sep. 19, 2022.
Colrain, U.S. Appl. No. 17/018,142, filed Sep. 11, 2020, Advisory Action, Aug. 5, 2022.
Colrain, U.S. Appl. No. 15/803,644, filed Nov. 3, 2017, Office Action, Mar. 9, 2020.
Giloni, U.S. Appl. No. 16/147,367, filed Sep. 28, 2018, Non-Final Rejection, Jan. 6, 2022.
U.S. Appl. No. 13/448,267, filed Apr. 16, 2012, Notice of Allowance, Aug. 14, 2014.
U.S. Appl. No. 13/542,278, filed Jul. 5, 2012, Final Office Action, May 2, 2013.
U.S. Appl. No. 14/748,451, filed Jun. 24, 2015, Office Action, May 16, 2016.
U.S. Appl. No. 14/748,451, filed Jun. 24, 2015, Notice of Allowance, Nov. 1, 2016.
U.S. Appl. No. 14/231,347, filed Mar. 31, 2014, Office Action, Nov. 19, 2014.
U.S. Appl. No. 14/231,347, filed Mar. 31, 2014, Notice of Allowance, Mar. 17, 2015.
U.S. Appl. No. 13/563,680, filed Jul. 31, 2012, Notice of Allowance, Dec. 23, 2013.
U.S. Appl. No. 13/542,278, filed Jul. 5, 2012, Office Action, Nov. 23, 2012.
Neel, U.S. Appl. No. 16/147,314, filed Sep. 28, 2018, Examiner's Answer to Appeal Brief, Mar. 3, 2023.
U.S. Appl. No. 13/542,278, filed Jul. 5, 2012, Notice of Allowance, Jun. 15, 2016.
U.S. Appl. No. 13/542,278, filed Jul. 5, 2012, Examiner's Answer, Jan. 29, 2014.
U.S. Appl. No. 13/448,267, filed Apr. 16, 2012, Office Action, Jan. 24, 2014.
U.S. Appl. No. 13/448,258, filed Apr. 16, 2012, Notice of Allowance, Oct. 30, 2014.
U.S. Appl. No. 13/448,258, filed Apr. 16, 2012, Office Action, May 27, 2014.
U.S. Appl. No. 13/229,641, filed Sep. 9, 2011, Office Action, Nov. 26, 2012.
U.S. Appl. No. 13/229,641, filed Sep. 9, 2011, Notice of Allowance, May 6, 2013.
Papadomanolakis, U.S. Appl. No. 13/076,313, filed Mar. 30, 2011, Office Action, Jun. 5, 2012.
Papadomanolakis, U.S. Appl. No. 13/076,313, filed Mar. 30, 2011, Notice of Allowance, Oct. 19, 2012.
Neel, U.S. Appl. No. 16/147,314, filed Sep. 28, 2018, Interview Summary, Mar. 19, 2021.
U.S. Appl. No. 13/542,278, filed Jul. 5, 2012, Notice of Allowance, Nov. 4, 2016.

* cited by examiner

FAILOVER OF DATABASE SESSIONS TO A LOGICAL REPLICA DATABASE

BENEFIT CLAIM

This application claims the benefit under 35 U.S.C. § 119(e) of provisional application 63/416,136, filed on Oct. 14, 2022, the entire content of which is hereby incorporated by reference for all purposes as if fully set forth herein.

RELATED APPLICATIONS

This application is related to:
U.S. application Ser. No. 16/147,314 "Session State Tracking," filed on Sep. 28, 2018,
U.S. application Ser. No. 16/147,367 "Session Templates" filed on Sep. 28, 2018,
U.S. application Ser. No. 17/018,142 "Termination of Database Sessions For Planned Failover" filed on Sep. 11, 2020,
U.S. application Ser. No. 17/018,181 "Automated Reset Of Session State" filed on Sep. 11, 2020,
U.S. Pat. No. 9,600,371, entitled "Preserving Server-Client Session Context," filed Jul. 5, 2012,
U.S. Pat. No. 8,924,346, entitled "Idempotence For Database Transactions," filed Apr. 16, 2012,
U.S. Pat. No. 8,984,170, entitled "Idempotence For Database Transactions," filed Apr. 16, 2012,
U.S. Pat. No. 8,549,154, entitled "Recovering Stateful Read-Only Database Sessions," filed Sep. 9, 2011,
U.S. Pat. No. 8,725,882, entitled "Masking Database Outages From Clients And Applications," filed Jul. 31, 2012,
U.S. Pat. No. 9,124,670, entitled "Transactional And Non-Transactional Data For Maintaining Session State," filed Mar. 31, 2014,
U.S. Pat. No. 9,591,103, entitled "Transactional And Non-Transactional Data For Maintaining Session State," filed Jun. 24, 2015,
U.S. Pat. No. 7,502,824, entitled "Database Shutdown With Session Migration," filed May 1, 2006,
U.S. Pat. No. 7,552,218, entitled "Transparent Session Migration Across Servers," filed Aug. 12, 2004,
U.S. Pat. No. 8,380,665, entitled "Application Workload Capture And Replay System," filed Mar. 30, 2011, and
U.S. Pat. No. 10,942,907, entitled "Safe Release of Database Sessions for Planned Maintenance Operations," filed on Nov. 3, 2017,
the entire content of each of which is hereby entirely incorporated by reference as if fully set forth herein.

FIELD OF THE TECHNOLOGY

The present invention relates to the field of electronic database management, in particular, to the failover of database sessions across databases.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Generally, any maintenance of a database management system (DBMS) requires the migration of sessions from one database server to another. The database server from which sessions are migrated is typically the "primary" database server for the sessions, while the database server to which the sessions are migrated is a "standby" database server. The primary and standby database servers may be on the same DBMS, different DBMSs or even different (major) version DBMSs. Such a session migration is very complex to accomplish, especially when the maintenance change is to a different DBMS version, The core problem is performing the maintenance requires a major version upgrade of a DBMS (DBMS Rolling). Upgrading the DBMS to a major version may change the logical and physical arrangement of objects in the memory. Applications connected to the DBMS prior to the upgrade may have cached object references identified based on their physical arrangements (e.g., ROWIDs, Large Object (LOB), transaction identifiers). Such object references may be invalid after the upgrade due to the changed physical arrangement of the objects.

Thus, upgrading the primary database server could break connected applications that rely on such arrangements, causing data integrity and corruption issues for the client applications, especially in the cloud computing environment. The cloud computing environment requires seamless and error-less transition for the consumer application(s) of the primary database server, such that the transition is transparent to the client application(s) using the database server.

Additionally, the fast (low-level) replication between the primary database and the standby database to keep the databases in synch may rely on arrangements of objects as well (e.g., redo log-based replication). An upgrade may break such an arrangement, making impossible further low-level object arrangement-based replication.

Naturally, it is desirable for the applications to continue running through the maintenance window of the DBMS. Such applications would have to tolerate errors, or errors must be hidden from the applications. For example, when performing a graceful failover without Application Continuity techniques, the application may not deterministically ascertain whether a transaction has been committed or not on the failed-over database. Such transactions (commit outcomes) may be lost before the inflight work is recovered.

One approach to handling session migration issues is for the applications that do not tolerate errors to be stopped by the application users for the maintenance window. Because the failover time is not predictable, many applications choose the safe option and stop for the full window, which can be many hours (e.g., four hours or longer). In many cases, the application servers are stopped at the start of the maintenance window and restarted at the end of the maintenance window. What seems like a short switchover to database administrators may, in fact, be a very long outage for the applications.

This manual-shutdown-for-maintenance approach is cumbersome and inflexible in system management, lowers availability and increases the likelihood of mistakes, and prohibits proper load balancing and scale-out at runtime. The procedure does not scale to large cloud maintenance operations for numerous applications nor to situations where it is impossible to agree on maintenance windows and allow for downtimes. As a result, users often see downtime during planned maintenance events:
  Service is unavailable,
  Application owners are unable to agree on maintenance windows,
  Long-running batch jobs (batches) see errors or are stopped in advance, Errors due to application work exceeding the allowed drain time,
DBAs and engineers work off-hours, and
Application and middleware components are restarted.

Because the "manual" communication process does not scale well, sometimes, maintenance is applied using a methodology that excludes relying on the client application logic. The DBMS halts the database stacks in a rolling fashion, causing unpredictable errors for the applications. For a cloud-based DBMS, which must be highly available, this is completely unacceptable. Arbitrary and disorderly termination of an in-use session by a DBMS due to planned maintenance or for other purposes, such as rebalancing, results in ambiguous errors returned to user applications, leading to user frustration, canceled and duplicated work, and in the worst cases, a restart of applications and application-related servers as valid transactions fail.

Most database deployment paradigms have a contractual obligation to apply database patch sets within a set time duration (e.g., at least once a quarter) and CPU-related patches (security patches) almost immediately. A DBMS that uses the "database as a service" is an example of this. The planned maintenance may create a disruptive experience for the applications if no techniques are used to alleviate this problem. For example, the survey of planned maintenance indicates:

a great percentage of the applications fail during the patching,
inability to negotiate maintenance windows across organizations,
database sessions are aborted,
unlike other cloud solutions, the availability of a cloud-based DBMS due to planned maintenance may be worse or on par with a standalone DBMS,
long recovery of systems that depend on the DBMS under planned maintenance. Systems operate in unison. When one system is taken out of production, it takes a long time for the whole system to recover.

Thus, there is a need for the application requested work to migrate from the database server instance under maintenance to another functioning server instance without the application incurring errors. Gradual migration of work is desirable.

Planned maintenance, such as an upgrade to a major revision, is an example of possible operations that require the database sessions to be terminated without disrupting applications. Other non-limiting examples of operations include rebalancing database sessions or workloads among database servers of a DBMS. The term "disconnection-requiring planned operation" or simply "planned operation" refers to such an operation.

BRIEF DESCRIPTION OF THE DRAWINGS

In the drawings of certain implementations in which like reference numerals refer to corresponding parts throughout the figures.

DETAILED DESCRIPTION

Figure 1:
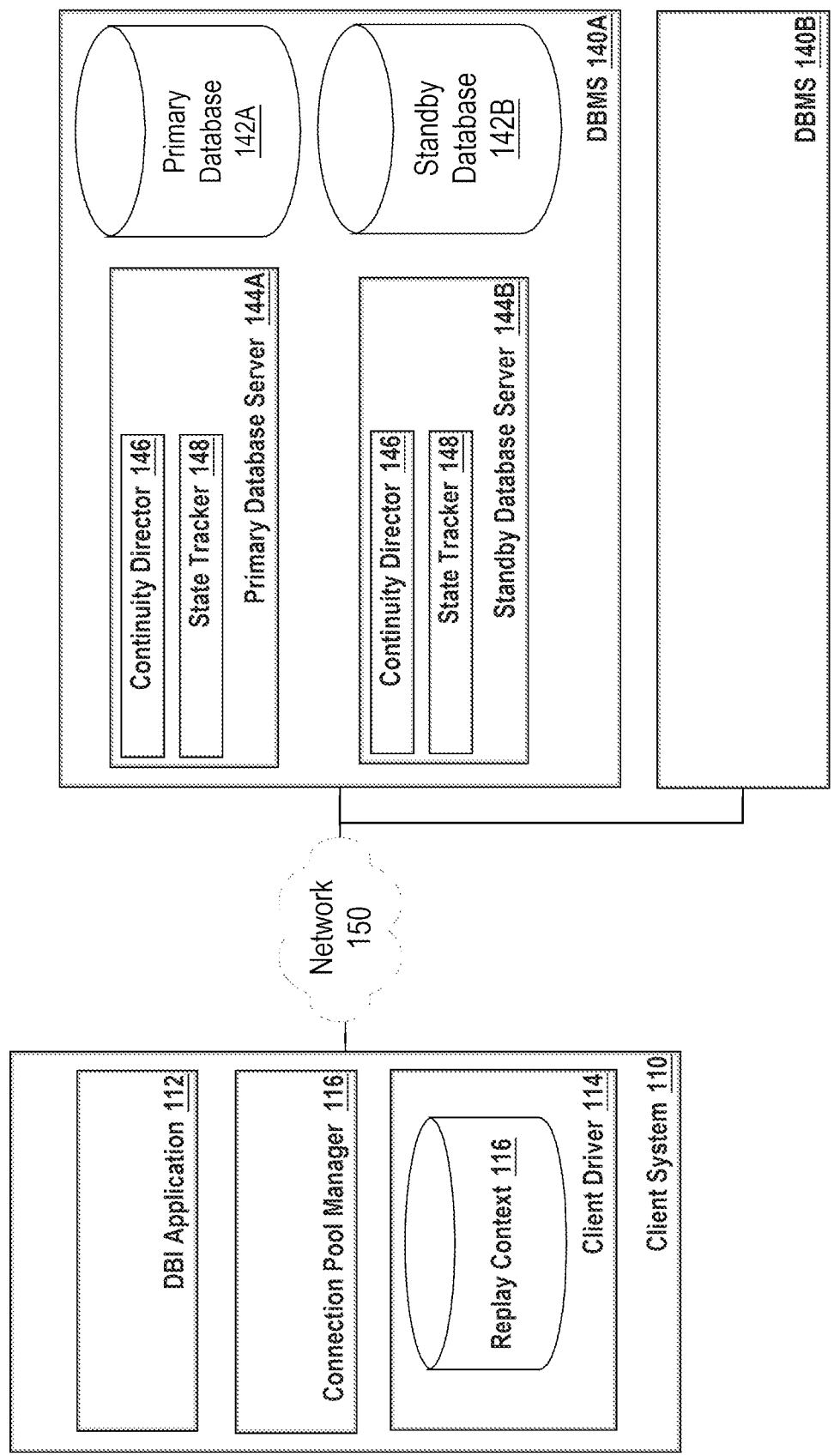
FIG. 1 is a block diagram that depicts a client computer system hosting a database interface (DBI) application interfacing with the primary database server and the standby database server, in one or more implementations.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe an automatic failover of sessions from a primary database to a logical copy (replicated) database of the primary database for a planned operation, such as a major version upgrade of the database management system. The logical replica database is a logical incarnation of the physical standby database. The logical replica database performs data synchronization with the primary database to contain the same data. However, unlike the physical standby database that is updated/synchronized with the primary database on an object-by-object basis (e.g., through a redo log application), the logical replica database is updated/synchronized with logical replication (e.g., SQL command replication execution, also referred to as "SQL apply"). Therefore, the storage arrangement of data on the logical replica database may be different (e.g., on the object level) from the primary database (or its physical standby database).

For example, the same row or column on the primary and logical databases may be stored in a different order and/or a different location in memory and, thus, have different row/column identifiers. Similarly, other types of objects, such as large objects (LOBs), may have different locators/references because the objects may be stored differently in the primary database and the logical replica database. Accordingly, although the same query may return the same result on the primary database and the logical replica database, the logical and physical identifiers/locators/references for the resulting data may be different on the logical database as compared to the primary database.

The logical replica database may be viewed as a completely independent database from the primary database and may be serviced by services of a different database management system (DBMS) than the primary database's DBMS. Accordingly, planned operations (e.g., a major version upgrade of DBMS software) may be performed on the logical replica database and its DBMS without affecting the primary database operations. When session(s) failover from the primary to the logical replica database, for the automatic and successful failing over of transaction(s) in the session(s), the database server of the logical replica database verifies whether the failover of the session has occurred at the correct database target, in an implementation.

Techniques herein further describe identifying and, if necessary, mapping any divergence in identifiers/references/locators of the primary database with those of the logical replica database. Mapping such identifiers ensures the idempotence of transactions during session failover(s) from the primary database to the logical replica database. Furthermore, using these techniques, the DBMS may determine whether the received client-side cached references (e.g., originated from the primary database) are valid on the logical replica database and reduce the probability of failing object requests by a client. Furthermore, the techniques described herein include adjusting the requested execution time of a query recorded at the primary database to a timestamp that is valid on the logical replica database, thereby avoiding inaccurate or failed execution when replaying such queries over the failover session(s). Additionally, version information is used to determine which validation algorithm(s) to use to validate checksums/signatures and/or other verification information across the logical database and the primary database.

System Overview

One approach to seamlessly perform a planned operation, such as an upgrade of a DBMS to a major version, is to first perform the planned operation on the standby database server to cause minimal disruptions to consumer application(s) (also referred to as Database Interfacing Applications (DBI)) connected to the primary database.

FIG. 1 is a block diagram that depicts a client computer system hosting a DBI application interfacing with the primary database server and the standby database server, in one or more implementations. Client system 110 is connected, through network 150, to database servers 144A and 144B of DBMS 140A and to database servers (not shown) of DBMS 140B. Although a single client system 110 is depicted, other implementations may include more client systems. Similarly, other implementations may include more or fewer DBMSs. Further, each DBMS may have more or fewer database servers and more or fewer databases.

DBI application 112 generally represents a database-backed application that executes on client system 110. DBI applications include but are not limited to application servers, mid-tier database applications, etc.

In an implementation, DBI applications interface with a DBMS using a Client-Driver on the client system. The "Database Client Driver" (or simply "Client-Driver") term refers to an application component that interfaces the application with a DBMS using the DBMS in a manner compliant with rules specified for the DBMS.

Client system 110 includes DBI application 112, which interfaces with DBMS 140A using Client-Driver 114. Client-Driver 114, in this example, may connect with DBMS 140A or DBMS 140B utilizing connection pool manager 116 (or without connection pool manager 116). Client-Driver 114 may interface with network interfaces of client system 110 to establish a connection with DBMS 140A or DBMS 140B.

In an implementation, DBI application 112 utilizes data stored on primary database 142A. Accordingly, DBI application 112 establishes active session(s) using connection(s) of connection pool manager 116 with primary database server 144A. As part of the execution of DBI application 112, DBI Application 112 requests primary database server 144A to execute commands to retrieve or modify objects stored on primary database 142A.

In an implementation, the changes made on primary database 142A are replicated to standby database 142B. One approach for performing such replication is to execute the same commands by standby database server 144B on standby database 142B. Since the commands for the database may be in an SQL format (although techniques are similarly applicable for non-SQL commands), this type of replication is referred to as "SQL replication." Such a client command-based replication between the primary database server 144A and logical replica database server 144B is also referred herein to as "logical replication."

However, another object-level approach for replication is more efficient. Rather than re-executing SQL commands as in the logical replication, the changes made to each object in primary database 142A are replicated to standby database 142B. Such type of replication is referred to herein as "object-level replication." For example, standby database server 144B may apply the redo log of primary database 142A to bring the objects of standby database 142B in synch with primary database 142A. For the object-level replication to work, the object arrangement amongst databases has to be the same; otherwise, the redo replication may corrupt standby database 142B.

Compliant Interfacing

As mentioned above, the Database Client Driver interfaces an application with a DBMS in a "compliant" manner. For example, to be compliant, the Database Client Driver may (a) have the ability to receive a notification from the DBMS about a disconnection-requiring planned operation and (b) have the ability to establish monitoring for determining a termination point in response to receiving the notification.

A client component, such as a database client driver or a CPM, may not be fully compliant with the DBMS if, for example, the component has been provided/developed by a different vendor than that of the DBMS or if the component is outdated and is not fully compatible with all the functions of a version of a DBMS with which the application is interfacing.

Disconnection-Requiring Planned Operations

In an implementation, DBMS 140A may itself initiate a communication (notification) with the client driver 114 to cause a particular action to be performed by client system 110. For example, a disconnection-requiring planned operation may be initiated for database server instance 144A, and one or more services of primary database server 144A may be migrated to another instance of the same database, standby database server 144B, by DBMS 140A or to another DBMS such as DBMS 140B. DBMS 140A may issue one or more database events regarding the planned operation to the connected database client drivers of client systems. Client-Driver 114 may receive and parse such an event. An example of such events is FAN events.

Application Continuity System (Application Continuity) provides for session continuity of established sessions of a client system with a DBMS for planned and unplanned disconnection events. Application Continuity includes one or more components of DBMS 140 and the client system, such as one or more components of DBMS 140 and client system 110. Replay context 116, which stores replay commands and metadata for performing a replay, and continuity director 146 are examples of such components that may be part of client system 110, primary database server 144A and standby database server 144B.

Other failover-related components (Application Continuity, Transparent Application Continuity, Transparent Application Failover, Transaction Guard) may be part of DBMS's 140A and 140B.

Additionally, an instance of a database may be converted to a logical instance having no physical dependency on the computing systems or environment on which it is being serviced. Such logical instances may be serviceable during planned operations or migrated from one DBMS to another. For example, DBMS 140A and DBMS 140B may host container databases (CDB) containing the metadata and common resources shared by all the pluggable databases (PDBs), such as primary database 142A and standby database 142B of DBMS 140A as an example. The PDB(s) may be logical instances that may be serviceable during planned operations of DBMS 140A or be unmounted from DBMS 140A, moved and mounted on DBMS 140B.

The conversion from a physical instance to a logical instance of a database helps eliminate data integrity and data corruption issues during planned operations, such as major version upgrades. The conversion is referred to herein as "logical switchover" or simply "switchover".

DBMS Rolling

Figure 2:
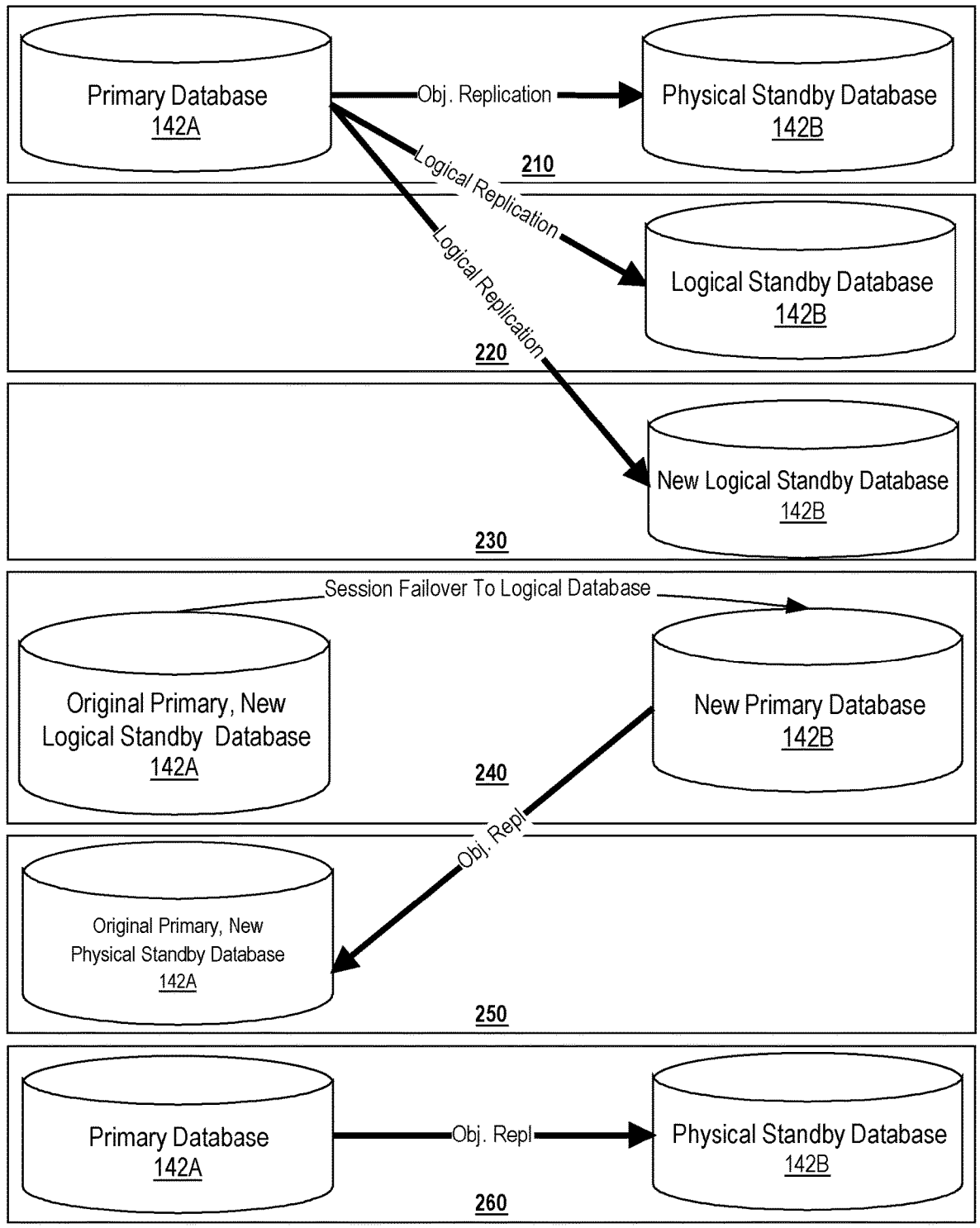
FIG. 2 is a block diagram depicting the flow of DBMS Rolling, in an implementation.

FIG. 2 is a block diagram depicting the flow of DBMS Rolling, in an implementation. At step 210, the prerequisites for failing over are verified. For example, one or more of the following sub-steps may be performed: a) analyze database schema to ensure that tables have a primary key or a unique key, b) initiate supplemental logging to ensure object information (such as redo logs) have supplemental logging that includes object metadata and timestamps, c) a guaranteed restore point is identified to which the primary and the standby databases may fall back.

Continuing with step 210, the upgrade process performs object-level replication from the primary database to the physical standby database. For example, the process, using media recovery, applies redo logs of the primary database to the physical standby database, bringing the physical standby to as current level as possible with the primary database and past the starting point for supplemental logging.

At step 220, the standby database, 142B, is converted from the physical standby database to a logical replica database. The switchover from the physical standby database to the logical replica database allows the logical replica database to be abstracted from any logical or physical data storage arrangement dependencies. For that reason, the logical replica database may be migrated from one DBMS to another or be operational on the same or another DBMS during a major upgrade.

However, the switchover from the physical standby database to the logical replica database prevents low-level object-based replication (redo log-based replication) in which the object arrangement amongst databases has to be the same. After the physical replication stops due to object arrangement incompatibility between the major version upgraded standby database and the original version of the primary database, the logical replication may be initiated from the primary database to the logical replica database. Because the logical replica database may be open for SQL operations even during the upgrade to a major version, the logical replication starts as soon as the upgrade is initiated, and low-level object replication is stopped at step 210.

At step 230, the intended, planned operations are performed on the logical replica database. The upgrade process may perform an upgrade of a major version of the host DBMS of the logical replica database. The logical replication continues from step 220 to resynchronize with the primary database, in an implementation.

At step 240, the standby database server, 144B, is converted to the new primary database, and new client requests are directed by the DBMS to the original standby database server and its database, 142B. Thereby, the new version database is converted to the new primary database, during which the sessions may be drained before aborting the sessions at the original primary database. Because simply aborting sessions may cause discontinuity and even data corruption for the client applications, techniques described herein perform an automatic failover of sessions from a primary database to a logical copy (replicated) database of the primary database.

At step 240, the original primary database, 142A, is converted to a logical database and flashed back to the guaranteed restored point at step 210, in an implementation. After draining the sessions from the original primary database, the original primary database is flashed back to the initial state before the initiation of the planned maintenance. The original primary database, 142A, may then be converted to a new logical replica database of the new primary database, 142B. As a new logical replica database, the original primary database is available to be mounted on the DBMS, which has already performed the planned maintenance operation.

At step 250, the new logical replica database (i.e., database 142A) is mounted on the DBMS that has already performed planned maintenance, such as a major version update. The DBMS may be the same DBMS on which the new primary database is mounted. Accordingly, the new logical replica database may be converted to the new physical standby database of the new primary database, 142B, but having the initial state of the guaranteed restore point of step 210. To bring the new physical standby database up-to-date, the new primary database initiates object-level replication (redo log stream replication).

At step 260, the new physical standby may be converted back to the primary database, and the new primary database may be converted back to the physical standby, as it was at the beginning of step 210. However, at this point, both databases are hosted by the DBMS that has performed the planned operation.

Session Failover

As discussed for step 240, the existing sessions of client applications that are executed on the old primary database have to be aborted. Because simply aborting sessions may cause discontinuity and even data corruption for the client applications, a failover of those sessions has to be performed to the new primary database. In order to perform the failover operation, the new primary (standby of the old primary) database has to be identical in data and in sync with the (old) primary database. The database servers of the standby (new primary) DBMS would have to service the client applications on its new standby database without interruptions to the applications until the maintenance on the primary DBMS is completed.

In order to perform a switchover to the new standby database, the primary database server for the original primary database has to disconnect all the active user sessions running on the primary database server. The database management system (DBMS) of the primary database has to ensure that its client applications are disconnected in an orderly manner. On the other hand, the client applications may continue to issue request(s) to perform database user calls, which execute SQL statements, API calls, and other commands in such sessions before the sessions are disconnected.

Thus, the switch to the new standby database kills the active user sessions running on the original primary. Restoration of those sessions can be costly in downtime for applications. Immediately after the switch, the outage endured by the applications that had been running on the original primary can extend their actual outage to many minutes to hours of downtime for a full mid-tier restart. Furthermore, in the cloud, the length of the downtime is exacerbated as it is unknown when the switchover will occur.

To be running through a maintenance window, applications must be able to tolerate errors, or errors must be hidden from them. The techniques described herein allow applications that cannot tolerate errors to continue running without having to be stopped by the application owners for the maintenance window. Because the failover time is not predictable, many applications choose the safe option and stop for the full window, which can be four hours or longer. In many cases, application servers are stopped at the start of the maintenance window and restarted at the end of the maintenance window. What seems like a short switchover to database administrators can be a very long outage for applications.

One approach may be to wait until the execution of the request(s) issued within the session is completed and then disconnect the connection to the primary database server. However, in many cases, requests do not complete in the allocated time. Requests may execute partially and then stop progressing; or requests may have long-running user calls, which may not be completed within the maintenance window; or for some requests, the instruction(s) that the request has completed are not received by the client drivers from the client application.

Even when the sessions with the primary database server are terminated, the restoration of those sessions on the new standby database server may be costly in downtime for the applications of the sessions. Immediately after the switchover, the outage endured by the applications that had been running on the original primary database server may extend the actual outage to many minutes to hours of downtime for a full or partial DBMS restart. Furthermore, in the cloud database management system, the length of the downtime is exacerbated as it is unknown when the switch may occur.

By providing a failover of applications to a different logical database, the failover techniques ensure low downtime when the primary database is switched to the logical replica database. Application sessions are drained before switchover and those sessions that could not drain in the allowed time failover to the logical replica database using a feature referred to herein as "Transaction Guard" for idempotence and a feature referred to herein as "Application Continuity" for the seamless transition by the application.

Transactions, Transaction Guard and Logical Transaction Identifier (LTXID)

A transaction is a set of operations that change data. In database systems, the operations are specified by one or more database commands. Committing a transaction refers to making the changes for a transaction permanent in the database. To preserve data integrity, changes by a transaction are made atomically, in an all-or-nothing manner, when the transaction is committed. Either all of the changes are committed, or the transaction is rolled back. When a transaction is made permanent, the logical transaction identifier is recorded as a part of that transaction at commit.

In various examples provided herein, a database system provides transaction idempotence from the perspective of the database transactional layer and extends access to this information to clients using "logical transaction IDs".

The logical transaction id is a globally unique identifier that uniquely defines a database transaction from the application perspective. The LTXID may be stored in a session handle and/or in a connection object of the client-driver. The LTXID is the foundation of the idempotence semantics.

In an implementation, DBMS (as part of the Transaction Guard techniques) maintains a logical transaction table in every (pluggable) database, such as the primary database, the standby database and the logical replica database. An application connects with the corresponding driver to the primary database. When the driver connects to the primary database, it starts a new database session. As part of the session creation, it also creates a new LTXID. The LTXID is only created and stored in the user session structure in memory and is then returned to the client driver. The LTXID may not yet be stored in the transaction history table. The new LTXID is returned to the driver, and the user may query the session handle to obtain the LTXID value.

In one implementation, the LTXID includes:
Version
Database identifier
Includes Pluggable database identifier for consolidated databases
Database instance identifier
Logical session number (GUID)
Commit number and/or
Service identifier In various implementations, the LTXID may be used to support at-most-once execution semantics for:
Local transactions,
Autonomous transactions,
Commit on Success (auto-commit),
Read-only transactions,
Recursive transactions,
Distributed and Remote transactions,
Parallel DML,
Job Scheduler transactions and/or
XA transactions.

The logical session number (GUID) is automatically assigned at session establishment. In one implementation, the GUID is an opaque structure that cannot be read by an application. In one implementation, the GUID is unique for the life of the transaction history.

In one implementation, for scalability, the running commit number is increased when a database transaction is committed. In one example, the LTXID starts at commit number zero. The LTXID might change only when changes are committed to the database. If only reading, the LTXID does not change.

In one implementation, a server in the database system keeps track of transactions that were committed by the server, recording the logical transaction IDs, and the server prevents transactions from being completed more than once by blocking those that did not commit, also using the LTXID because such transaction may be attempted on the failover session.

After committing, the next LTXID to use is returned to the client. In one implementation, a running commit number that is part of the LTXID is incremented and returned to the client as part of the LTXID after each commit completes or after each set of commands that includes at least one commit completes.

In one implementation, Transaction Guard, a logic within the DBMS, uses the LTXID to eliminate the possibility of duplicate transactions. The LTXID is persisted on commit and is reused following a rollback. During normal runtime, an LTXID is automatically held in the session at both the client and server for each database transaction. At commit, the LTXID is persisted as part of committing the transaction.

The Transaction Guard ensures that if a database session has failed over to a standby database while handling a transaction, then the transaction may be completed on a new failed over database session without the risk of having the transaction also completed on the original database session. Transaction Guard accomplishes this by enforcing the uncommitted state by blocking, on the new session, the transaction(s) identified by that LTXID from committing in the original session, in an implementation. The server may provide transaction idempotence transparently to the client and in a manner that scales for multiple clients in multiple sessions with multiple servers, even when multiple transactions are being executed in a session.

In one implementation, the server allows a transaction to be committed even if the execution of the transaction was not completed during the first attempt. The server saves an LTXID at commit for transactions against the database. These transactions may include, for example, transactions executed using auto-commit, from inside PL/SQL, from inside server-side Java, from remote transactions, from parallel transactions, from distributed transactions, and from callouts that cannot otherwise be identified using generic means. The server uses the LTXID to support at-most-once execution semantics such that database transactions protected by LTXIDs cannot be duplicated regardless of whether there are multiple copies of the transaction in flight. In other words, the client may submit several requests to complete the same transaction, and the server may prevent the transaction from being completed more than once.

In one implementation, the server blocks committing in-flight work to ensure that, regardless of the failover, another submission of the same transaction, for example, by a browser or mid-tier client, cannot commit. The server may identify repeated attempts to complete the same transaction by keeping track of the state of the transaction as affected by the various attempts to complete the transaction using an LTXID for each attempt to resubmit that transaction. For example, the server may enforce the uncommitted state by updating the logical transaction ID that represents a transactional set of commands to a blocked state when the server attempts to resolve the set of commands in case the set of commands had already been submitted for execution.

In one implementation, the server keeps track of work that is committed for a set of commands associated with an LTXID. The server may identify whether work was committed as part of a top-level call (client to server) or was embedded in a procedure such as a PL/SQL or Java procedure at the server, or as part of a commit operation that involved returning other information such as out binds or returned messages. The server may store an indication that the set of commands has an embedded commit state. The embedded commit state indicates that, while a commit is completed, the entire procedure in which the commit has been executed has not yet run to completion. Any work beyond the commit cannot be guaranteed to have been completed until the parent procedure returns to the database server and all results are received by the client.

In an example method, the primary database server receives a set of commands for execution in a session. The primary server session already holds the LTXID that was passed to the client at the authentication or that the client has obtained at checkout. The set of one or more commands, if completed in the session, would cause the execution of a first server operation that starts a transaction and a second server operation that commits the transaction. In this example, the server determines whether the set of commands includes at least one command that, if executed, would start at least one transaction. In response to determining that the set of commands includes at least one command that, if executed, would start at least one transaction, the server updates stored information for the LTXID as part of the commit operation. In one example, the server performs a server operation that includes both committing changes and inserting or updating stored information to the transaction history table to indicate that at least one transaction in the set of commands has been committed using that LTXID. After committing, a new LTXID is generated and returned to the client on the return trip for the commit message.

In one implementation, the primary database server stores a transaction history table that includes an entry for each transactional set of commands of the multiple transactional sets of commands that were received in the session. The server may update the stored information to indicate that a transaction has started in a set of commands by adding an entry to the transaction history table for the set of commands.

In one implementation, a mapping of LTXIDs to database transactions is persisted in a transaction history table. For a given session, a server may insert if the first time for an LTXID or update a current LTXID when the server executes a COMMIT or a last COMMIT in a set of commands in the session. The insert or update is stored in the transaction history table, which is available to other sessions and servers in case of a failover.

In one implementation, the server executes a callback to create or update an LTXID entry in a transaction history table when a transaction is opened. The server inserts a first occurrence when a redo is generated, and the server updates subsequent occurrences in a predictable manner. The server may also execute a callback to create or update an LTXID at commit. After the redo is durable on disk, the server may increment the commit number in the LTXID by one or indicate the commit in some other predictable or deterministic manner. The server may return the increment or other update on the session handle with the commit outcome in the transaction history table.

In an implementation, the transaction history table is updated with the new LTXID using an SQL command. After planned maintenance is initiated (e.g., when the logical replication from a primary database to the logical replica database has been initiated), all other methodologies of updating the transaction history table and generating new LTXIDs are disabled. Thus, Transaction Guard generates a sequence of SQL DDL statements for updating the transaction history table with LTXID for the transactions in the sessions on the primary database.

The logical replication of changes from the primary database to the logical replica database includes replicating the SQL commands executed on the primary database for the transaction history table of the primary database. The SQL command(s) that insert LTXIDs (and other info) for a committed transaction into the transaction history table is, therefore, executed on the logical replica database as part of the logical replication of changes (SQL apply).

In an implementation, the primary or standby database server may modify the SQL commands for the transaction history table to also include the original primary key values (e.g., ROWID) of the primary database. Such primary key values may be recorded in the supplemental logs. Accordingly, the transaction history table of the primary database may be (fully) regenerated on the logical replica database, including the original ROWIDs. Thus, the transaction identifiers for failover sessions of the primary database are fully replicated in the transaction history table of the logical replica database and accurately represent the transactions already committed on the primary database.

Database Signoff

In an implementation, when an application session fails over due to disconnection by the primary database server from the primary database to the standby database server, the standby database server verifies that the target database server of the new failed-over session is indeed the logical replica database of the primary database.

Figure 4:
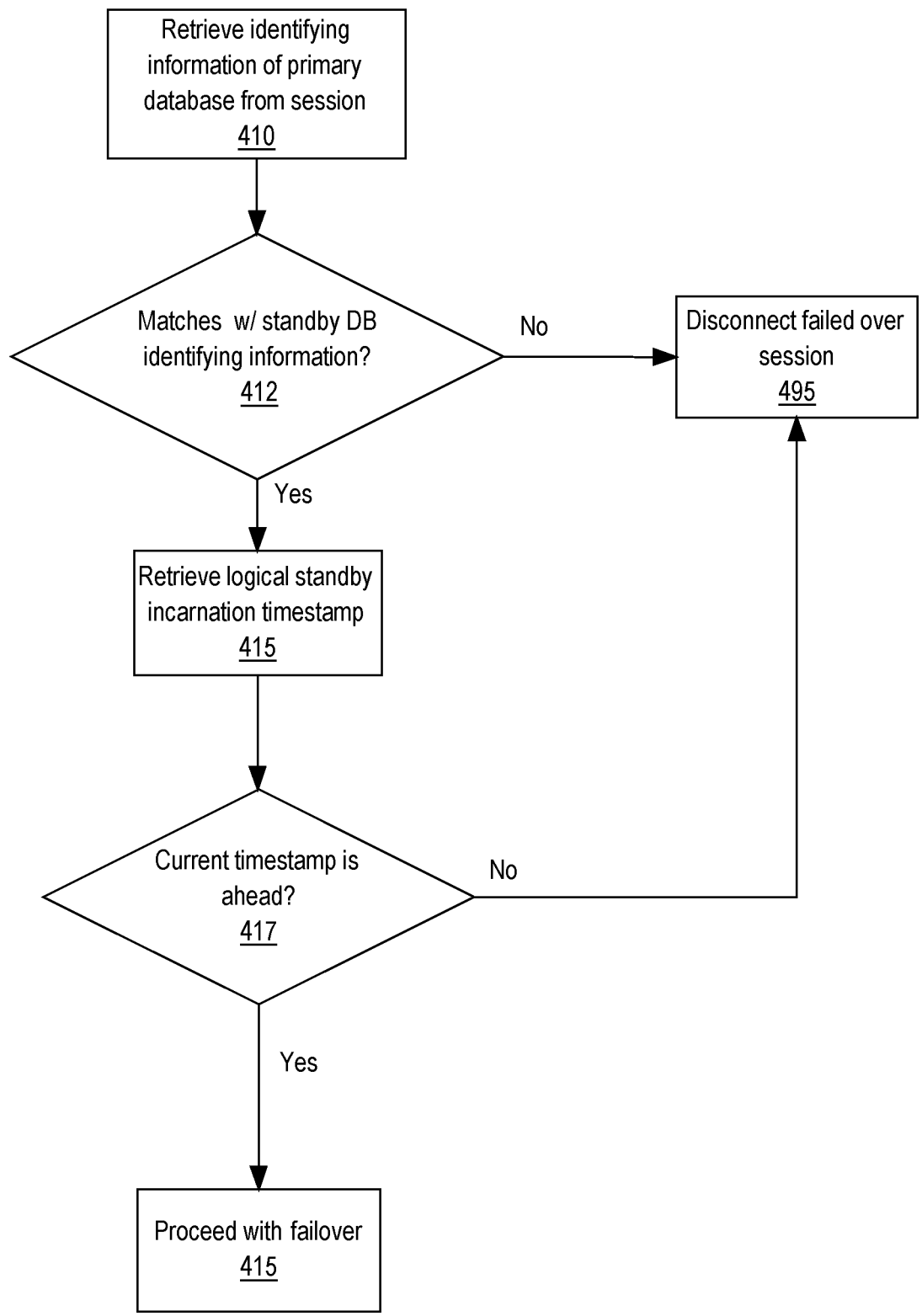
FIG. 4 is a block diagram that depicts a flowchart of a process performing one or more steps of a session failover, in an implementation.

FIG. 4 is a block diagram that depicts a flowchart of a process performing one or more steps of a session failover, in an implementation. At step 410, the standby database server retrieves the identifying information from the replay context of the client and, at step 412, compares it to the identifying information of the logical replica database. If the identifying information from the client replay context fails to match the identifying information retrieved by the standby server, then the failover is aborted, and the client application handles the disconnection at step 495. If the identifying information matches, then the failover of the session may proceed, and the process moves to step 415.

For example, the standby logical database continues to have the same database identifier (DBID/PDBID) as the primary database even after the logical switchover. Accordingly, the DBID/PDBID of the failover session is compared with the DBID/PDBID of the standby database server. Based, at least in part, on matching the identifiers of the database, the logical replicate server may proceed with processing the failover.

Additionally, or alternatively, the standby database server may verify object-level (redo) ancestry with the primary database as another identifying information at step 410. To further determine that the failover session originated from the original primary database, the incarnation timestamp (e.g., reset logs SCN/timestamp) of the original standby database and the same incarnation timestamp (e.g., reset logs SCN/timestamp) in the captured client replay context of the session are compared at step 412. The logical replica database used to be a physical standby database of the primary database; thus, the standby database server has access to the information of the incarnations of the original primary database, including that of the original physical standby and itself. If the information matches, the process proceeds to step 415 to continue with the processing of the failover. Otherwise, the failover session may be disconnected at step 495.

In an implementation, the failed over session may perform an additional check to determine whether the logical database has not been rolled back in time. During the failover, at step 415, the standby database server retrieves the logical replica database incarnation timestamp and, at step 417, compares it with the current timestamp of the logical replica database. The current timestamp of the logical replica database has to be ahead if no rollback has been performed. If the standby database server determines that the standby database server's current time is before the retrieved incarnation timestamp, then the failover is aborted. The client application may handle the disconnection of the failed over session at step 495. Otherwise, the process proceeds with performing the failover.

Failover of a session from an old primary to a new primary verifies that the new primary is the correct database forward in time, in an implementation. To perform the verification, at a failover of a session, the target database is probed to determine that the target database is from the same primary database and has the same object ancestry (DBID/redo/system change number (logical timestamp) ancestry) as the primary database. In an implementation, identifying information of the primary database may be available to the logical replica database server because the logical replica database has been spawned (started) from the primary database and, thus, has recorded the identifying information of the primary database. At the same time, the failing-over session has the identifying information of the primary database stored in the original session's replay context in preparation for the planned operation for a possible failover of session(s). The standby database server verifies the target database by comparing the identifying information from the session and from the database.

Figure 3:
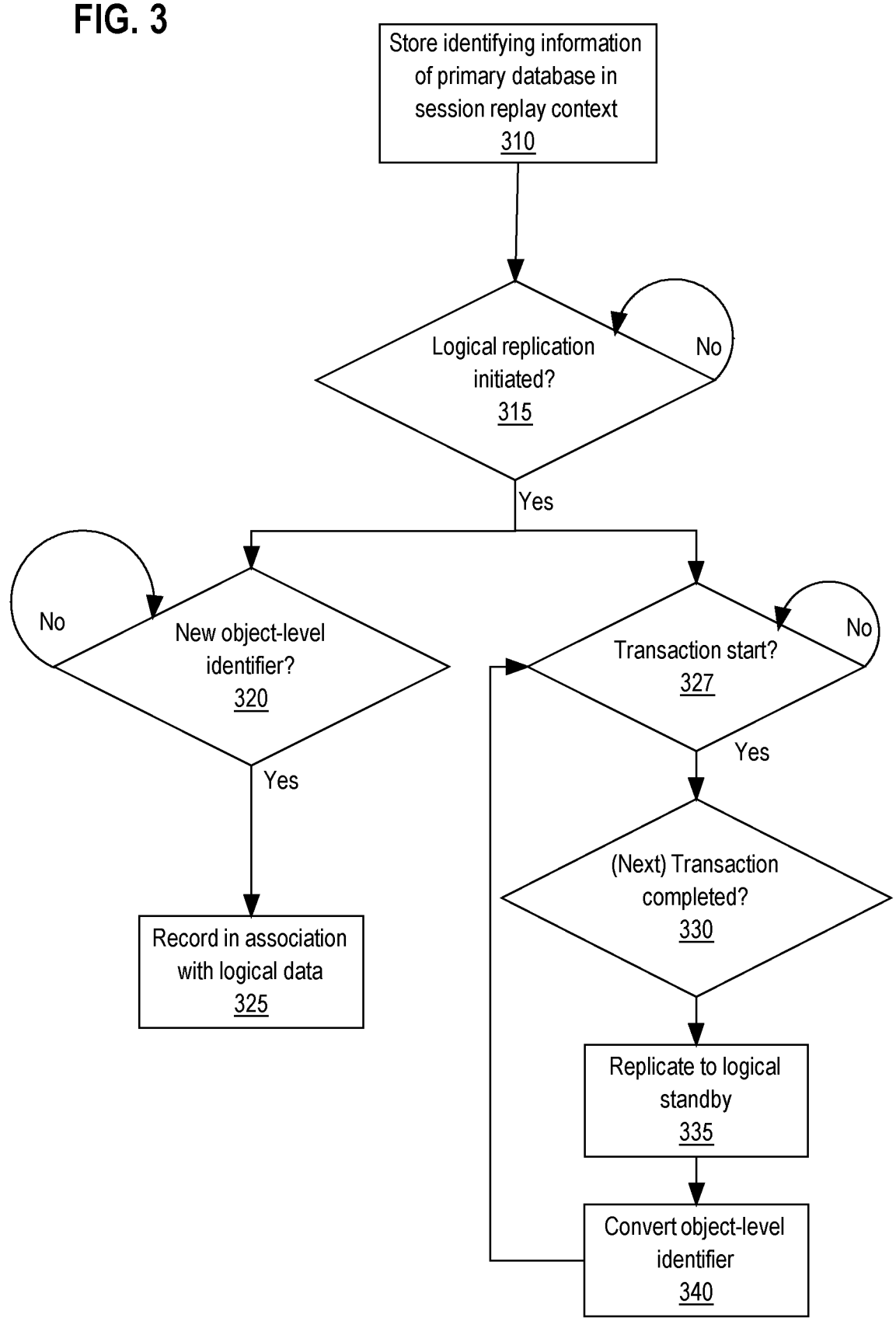
FIG. 3 is a block diagram that depicts a flowchart of a process for preparing a primary database for a planned operation, in an implementation.

FIG. 3 is a block diagram that depicts a flowchart of a process for preparing a primary database for a planned operation, in an implementation. At step 310, the primary database server of the primary database may record in the client replay context the identifying information of the primary and/or physical standby database. The identifying information may include the timestamp of the creation of the logical replica database, which may be recorded and available for retrieval when a session is failed over to the logical replica database.

For example, the reset logs SCN, a (logical) timestamp referred to herein as the "standby spawn timestamp", for spawning the standby database from the primary database, may be recorded in the control file. The control file is available for reading by the standby database server during a session failover, and the recorded reset logs SCN may thereby be retrieved. Alternatively, or additionally, the incarnation timestamp of the standby database may be recorded in the client replay context and available for retrieval in the failed-over session with the logical replica database.

When the logical switchover occurs for the standby database, and the logical replication is initiated, the logical replica database loses the object (redo/physical) ancestry of the source primary database. With new updates due to logical replication, the object-level information at the logical replica database may diverge from the primary database while the data is kept in sync.

Despite this divergence, the logical replica database server continues to have access to the identifying information of the primary production and standby databases because the logical replica database is an incarnation of the standby database of the primary database.

Mapping Object-Level Identifiers

In an implementation, identifier mapping is performed for a successful failover. Unlike the physical standby database, which has to have the same arrangement of objects in the memory (e.g., ROWID's of rows in a table) as the primary database of which it is the standby, the logical database's object arrangement in memory may vary from its primary database, as discussed above. Thus, while the physical standby database may replicate changes on the object level (e.g., using redo logs), the same may corrupt the logical replica database. Accordingly, the logical replica database uses SQL commands to replicate changes made in the primary database. Because of the query-level command replication, the object-level identifiers of the logical replica database may differ from the corresponding object-level identifiers of the primary database or the physical standby thereof.

The term "object-level identifier" refers herein to an identifier that is generated based on a particular storage arrangement of the object in the database and is associated with the object. For example, if a user is created on the primary database and the logical replication executes the same SQL for the user creation on the logical replica database, the user identifiers for this same newly created user may be different on the primary database and the logical replica database. The system table for the user information may assign a different identifier for the same user based on the arrangement of rows in the system tables on the primary database and the logical replica database.

Such object-level identifiers may be transaction-required identifiers that are required for completing the failover of a session successfully on the logical replica database. For example, the user identifier may be one of the keys for accessing records in the transaction history table for a failover session, thereby determining which transaction(s) in the session has been successfully committed and which has to be replayed. If such a failover session was initiated by a new user (a user who was created after the logical replication was initiated on the logical replicate or after the logical replicate had been spawned), then the user identifier for the original session on the primary database is different from the user identifier for the failover session on the logical replica database.

Thus, after the failover, when the Transaction Guard attempts to retrieve records for the transaction(s) of the session in the transaction history table, no records may be returned because of this mismatch of the user identifiers. Accordingly, the failed-over-session to the logical replica database may not be able to identify the transaction history for its corresponding session on the primary database using the user identifier from the logical replica database.

In an implementation, an object-level identifier that has been created on the primary database is converted to the corresponding object-level identifier on the logical replica database. The object-level identifier conversion is performed using mapping data that includes mappings of the primary database and standby logical database object-level identifiers to logical data that is the same for the corresponding logical replica database object-level identifier, in an implementation. The term "logical data" refers herein to the data that uniquely describes the object referenced by an identifier. The logical data, unlike the object-level identifier, does not change based on the storage arrangement of the object. For example, for a user identifier, the logical data includes the user name of the user associated with the user identifier.

In an implementation, the primary database server generates mapping data that associates the primary database's object-level identifier with the corresponding logical data. The mapping data may be replicated to the logical replica database and/or be made accessible to the standby database server.

During logical replication, the standby database server may use the mapping data to convert any referenced object-level identifier of the primary database to the corresponding object-level identifier of the logical replica database. Accordingly, the logical replication updates the standby database with the object-level identifiers that are particular to the logical replica database object-level identifiers. When the standby database server queries for transactions using the standby object-level identifier, the corresponding entries that were previously associated with the corresponding primary object-level identifier are returned.

In another implementation, the mapping data stores the mapping of primary object-level identifiers to the corresponding standby object-level identifier (e.g., through the corresponding logical data). After the failover, when the standby database server's query for a particular object level identifier fails, the standby database server may query the associated mapping data to retrieve the original object level identifier. The standby database server uses the original object-level identifier for the querying.

Continuing with the Transaction Guard's operations, if, after failover, the Transaction Guard were to use the logical replica database user identifier, the transactions for any new user created after the start of the logical replication would not be returned, even if such a transaction, in fact, existed, because the user identifiers for primary and standby may not match.

For that reason, during the logical replication, the primary database user identifiers are converted to the standby database user identifiers for the replication of transaction history. The user identifier of the logical replica database is determined based on the same user name as the user identifier of the primary database. After the failover, when Transaction Guard queries for a logical transaction identifier(s) (LTXID(s)) with a user identifier, even if the user identifier was created after the logical replication, the transaction history table for the logical replica database returns accurate results. Based on the accurate results, the Transaction Guard determines whether or not to replay a transaction.

Continuing with FIG. 3, at step 315, the primary database server detects that logical replication has been initiated as part of the planned operation. Once the logical replication is initiated, object-level identifiers for the same logical data may diverge, and because such object-level identifiers are necessary for Transaction Guard, the transactions may not successfully failover to the logical standby database.

To avoid the divergence of usernames after the logical replica database is spawned and logical replication is initiated at step 315, if the process at step 320 determines that a new object-level identifier has been generated on the primary database server, at step 325, the process supplementally records the newly created usernames (s) in association with the corresponding logical data at step 330, in an implementation. Therefore, at step 325, mapping data is generated for the newly generated username identifier.

For example, the primary database server may record the newly generated user identifier along with the corresponding newly created username in a supplemental log available for the standby server. In one implementation, the mapping data is stored in such a manner as to be accessible from the logical replica database server.

Transaction Guard Across Failover to Logical Replica Database

For dictionary transactions such as Transaction Guard (LTXID_TRANS) dictionary rows, the rows may not exist on the standby database because of the username identifier mismatch. Thus, the username identifier conversion may have to be performed to transfer and apply the Transaction Guard dictionary rows to the new database for the transaction history table before the transaction history table is opened for user work. When the rows are successfully replicated, the committed transactions are known for the session on the logical replica database server, and uncommitted stay that way before being replayed when failing over the user sessions to the logical replica database.

For example, when a session fails over, the new session with the logical replica database is established with the same username as the original session. However, the session's user identifier (if the corresponding username was created after the SQL synchronization) is different for the logical replica database (because it may have been created after the initiation of the logical replication). If the standby database server queries the transaction history table with its user identifier, no record may be returned because of the mismatch of the user identifiers.

To address the mismatch, continuing with FIG. 3, at step 315, the primary database server detects that logical replication has been initiated as part of the planned operation. The primary database server initiates the replication of transaction history to the logical replica database.

At step 327, whenever a new transaction is initiated at the primary database, the transaction history is to be replicated to the logical replicate. When the transaction is completed (which may include the logical replication of changes of the transaction (SQL apply) to the logical replica database) at step 330, the primary database server replicates the changes to the transaction history table for the transaction to the logical replica database, at step 335. Continuous execution of steps 330 and 335 provides the standby database with the latest transaction history of the primary database. The information about committed transactions on the primary database may then be used by the standby database server when the failover occurs.

To correct the mismatch of object-level identifiers, in an implementation, object-level identifier conversion from the primary database value to the standby database value is performed when user transactions are applied to the transaction history table at step 340. At the receipt of the transaction history update request from the primary database server, the standby database server queries the mapping data with the primary database object-level identifier value to retrieve corresponding logical data. Based on the logical data, the standby database server determines the standby database value for the same object-level identifier. The transaction is updated on the standby database with the converted standby database object-level identifier.

No conversion of object-level identifiers occurs if the mapping data fails to contain the object-level identifier of the primary database, indicating that the object-level identifier has the same value on the standby database.

Such an object-level identifier may be a user identifier, as discussed above. In an implementation, when replicating entries of the transaction history table to the logical replica database, the primary database server may request the standby database server to convert its own user identifier(s) (among other identifiers) of the primary database to the corresponding user identifier(s) of the logical replica database. The standby database server queries the mapping data with the user identifier received from the primary database server. If a mapping exists, the username is retrieved for the primary database user identifier, and the corresponding standby database user identifier is retrieved for the username. The standby database server applies the replication to the transaction history on the logical replicated table, associating the converted user identifier of the logical replica database to the transaction.

The Transaction Guard techniques provide idempotence for a session failover from the primary database to the standby database so that a commit occurs no more than once. Idempotence is required for failing sessions over to the same or another instance of the database. Accordingly, when a session fails over to the logical replica database and executes in the context of the user identifier of the logical replica database, the session may retrieve the corresponding records about the transactions using such user identifier and the LTXID from its replay context.

In an implementation, after switching to using SQL apply for the LTXID, logical replication may not start until all current direct updates are completed and are physically replicated to the standby database. The standby database server applies the changes to the transaction history table in line with the user transactions being applied through the SQL apply to the logical replica database. In such an implementation, the logical replica database applies DDL's in its entirety. The DDL application (through SQL apply) recreates the LTXID entry rather than applying the raw records, thereby replicating the transaction history table on the Because allowing the commit to proceed blocks later attempts to commit a transaction using the same LTXID, the replicated transaction history table of the primary database on the logical replica database provides information on the result of the commit in the session before failover. An LTXID may be stored or updated at commit time. After committing, a copy of the next LTXID that the server plans to use for that session is returned to the client.

After a failover, the client connects to the standby server servicing the logical replica database. In one implementation, the current LTXID for a session describes the next transaction to be committed in the session. The current LTXID may be calculated from the previous LTXID in some predictable manner, such as by incrementing the previous LTXID. The server passes the client the next LTXID that the server plans to use when the server sends a notification to the client that the transaction associated with the previous LTXID has been committed. Accordingly, having the LTXID received from the primary database server, the client may determine whether the last transaction on the primary database server has been committed or not.

To determine whether the transaction with an LTXID has been committed or not, the transaction history table may be queried using object-level identifiers. If the object-level identifiers have been converted to the standby database object-level identifiers, then using the LTXID from the previous connection to the primary database, the outcome of the last transaction is determined. If that transaction was not committed, the server might block that LTXID, so preventing an earlier in-flight transaction using that LTXID from committing that was active before the replay. An attempt to block the LTXID may fail if the LTXID has already been committed or if the LTXID was previously blocked. The client may replay the transaction on the logical replica database.

If the transaction is determined to have been committed and thus permanently applied to the logical replica database, then the standby database server omits to replay of the transaction on the logical replica database.

In another implementation, in which the object level identifier is not converted during the replication of the transaction history table from the primary database to the standby database, the conversion may occur during the failover. In such an implementation, the standby database server queries the mapping data with the logical data, such as the username of the failed over-session and retrieves the primary-generated user identifier. The standby database server may use the primary production-generated user identifier to query the transaction history table and retrieve results for the failed-over session.

Maintaining "as of" Queries at Failover

Since the logical replica database lacks physical continuity with the primary database, the standby server may not be able to perform flashback queries based on SCN before the logical replica database is spawned. In such queries, the requested timestamp/SCN in the "AS OF" construct may be prior to the logical switchover timestamp/SCN and thus may not be valid at the logical replica database.

In the absence of the query indicated SCN, the AS OF construct is replaced by the switchover SCN. The difference in the results between the execution for the current SCN as compared with the original SCN in the replay may be slight, as few transactions will have been applied since the switchover. Furthermore, the logical replicate's SCN has used a different redo stream. Thus, execution of the AS OF uses the switchover SCN where it is VALID.

The validity of the timestamp for the logical database is based on the timestamp being before or after the switchover timestamp of the logical replica database. The timestamps before the switchover timestamp of the logical replica database are replaced with the switchover timestamp itself (for any AS OF query), in an implementation.

For example, when a session fails over from the primary database to the logical replica database, the commands stored in the replay context of the client system may be replayed on the logical replica database. One or more of the commands may include a flashback query. If the requested timestamp of the execution is prior to the timestamp of the spawning of the logical replica database, the AS OF timestamp is replaced by the switchover SCN for the execution. Since there have been no changes before the switchover, the results of the execution are accurate. Additionally, the results are verified before returning the replay to the user.

When a query on the primary database is recorded into the replay context for a possible replay on a standby database, the query may be converted to or may, in fact, be a flashback query to provide the highest likelihood that returned results on a recovery database match the original results on the primary database using the switchover SCN. A flashback query is a query that is requested to be executed "AS OF" at a particular time, such that the result of the query is what it would be if the query was executed at that particular time. In one implementation, an "AS OF" construct is added to the query with the corresponding SCN, logical timestamp, of the execution time to ensure that the query produces results that are the closest to the original database state when the query was first executed or requested to be executed.

In one implementation, during the preparation for the failover, the original timestamp of the flashback query in the replay context is analyzed to determine whether the timestamp is valid on the logical replica database. If the timestamp is not valid, then the timestamp is replaced by the switchover SCN. This is the earliest SCN that results may have been changed.

Stated differently, if the query in the replay context is recorded to be replayed at a timestamp, that is, before the switchover SCN, when the logical replica database was switched over, then the timestamp is replaced by the switchover SCN. Accordingly, the original SCNs of the AS OF queries in the replay context are compared with the switchover SCN for the logical replica database. The original SCNs that are earlier than the switchover SCN are replaced with the switchover SCN, the earliest valid SCN for the logical replica database. Other timestamps may be preserved or executed at the current time of the logical replica database.

When a session has failed over to the logical replica database, and the standby database server executes a flashback query from the replay context, the query SCN in the replay context is reset to the switchover SCN. In one implementation, the standby database server replaces the SCNs of flashback queries when the original SCNs are earlier than the switchover SCN of the logical replica database. Instead, the standby database server executes the query with the reset logs SCN of the logical replica database, the earliest valid SCN for the logical replica database.

The results returned for the converted SCN flashback queries from the replay context should be consistent with the primary database because no services were started before the switchover SCN of the logical replica database. There is no user access before the switchover SCN.

Maintaining Client-Retained Object References Across Failover

Additionally, a client system may retain a reference to an object returned by the primary database. A reference to an object is another example of an object-level identifier. The client system may initially obtain the reference by querying the object and receiving in response a reference to the object on the primary database (alternative or in addition to the object itself). The client system may cache the reference and present the reference at any point to the primary database to retrieve the corresponding object itself. Since the cached reference may be based on the physical arrangement of objects in the memory, the cached reference may not be valid on the logical replica database of the primary database. Accordingly, presenting the cached reference at the logical replicate would produce an error and may prevent the successful failover of session(s) that may utilize such object references.

A non-limiting example of an object reference that may be cached by a client is a large object (LOB) locator. The LOB locators are database-specific physical addresses for accessing LOB data and may additionally include the generation timestamp on the originating database. For example, an LOB locator may contain the LOB Identifier, LOB version, and the SCN (database logical timestamp) of the LOB generation. The LOB locators may be cached in the client system and used anytime in the future. This poses a significant issue as after failover, a client may use a LOB locator at the new logically created logical replica database. The logical replica database, being at least partially a logical incarnation of the primary database, may not be able to resolve LOB locators referencing physical addresses of objects that may not be any longer at the same physical address.

However, object references that have been generated prior to the logical replication and which data has not been modified during the logical replication are valid on the logical replicate database, in an implementation. The logical replicate database, being an incarnation of the physical standby database, correctly inherits the objects and the arrangement of the objects that have been replicated prior to the logical incarnation (switchover) to the logical replica database from the physical standby database. Accordingly, if the object has not been modified during the logical replication, then the object may be accessed by the original object reference from the client system.

On the other hand, if the operation for modification of the object has been performed during the logical replication, the object reference that was generated on the primary database is invalid on the logical replica database. In such a case, if such an operation for the modification is available in the replay context of the client system, then the operation may be replayed on the logical replica database, and the new accurate object reference re-generated for the client system referencing the corresponding object on the logical replica database.

In an implementation, when an object reference is generated during the logical replication, additional object metadata is associated with (e.g., included within) the object reference to indicate whether the object reference may or may not be valid at the next use by the client system, particularly for the logical replica database. This additional metadata is returned to the client system and is available for retrieval when the client system requests operation using the associated object reference.

At any point in time, when a database server receives a client request to retrieve the object for an object reference, the database server checks whether the additional object metadata exists for the object reference. The current database of the database server may be the primary, physical standby or logical replica database.

In an implementation, based on whether the metadata exists, further based on whether such metadata indicates that the object has been modified during the logical replication, and whether such modification is re-playable, the database server determines whether to proceed with the object request operation for the object reference or reject the reference as invalid for the database. Since the additional object metadata is in addition to the originally generated object reference, the object reference may continue to be used by the client system in all other scenarios (apart from the logical replica database failover) to retrieve the object, guaranteeing compatibility for the object reference with other features of the DBMS (e.g., Data Guard, RAC, local failover).

Figure 5:
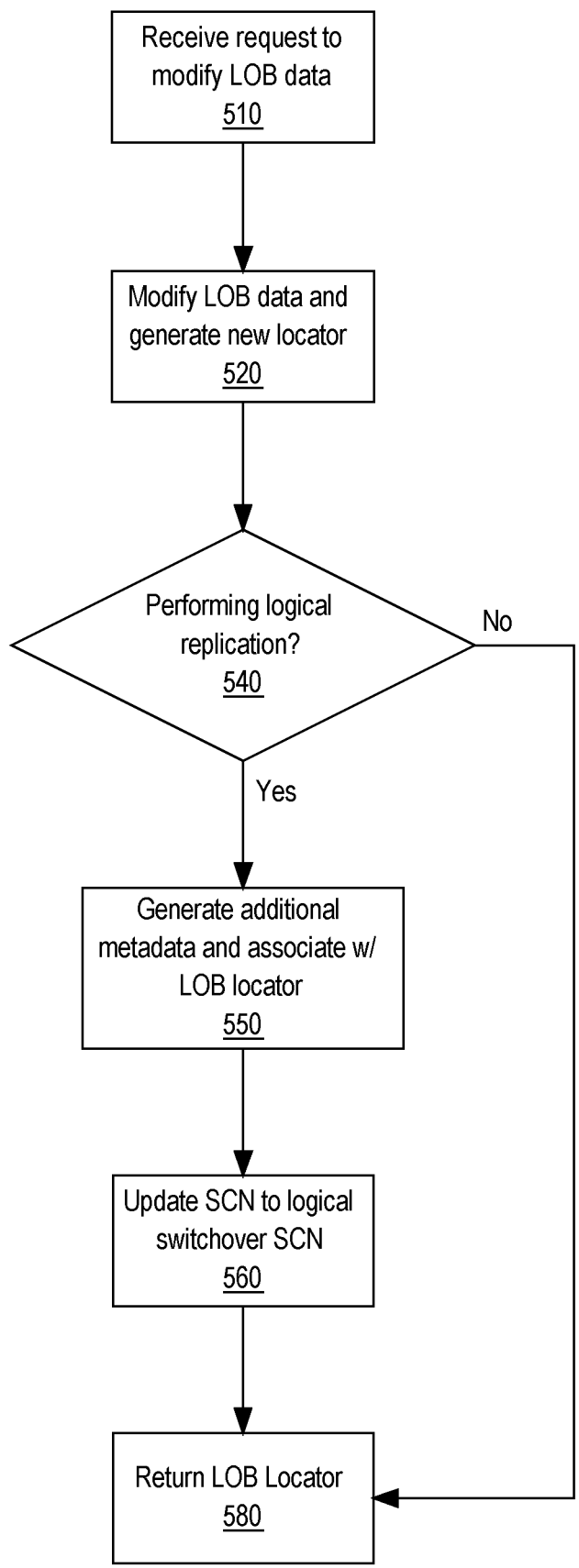
FIG. 5 is a block diagram that illustrates a process for generating LOB locators, in an implementation.

For example, the primary database server, when in receipt of operation to modify LOB data, has to make a determination whether it is currently in logical replication or not. FIG. 5 is a block diagram that illustrates a process for generating LOB locators, in an implementation. At step 510, the primary database server receives a request from a client system to modify LOB data. At step 520, the primary database server modifies the LOB data and generates a new LOB locator for the modified LOB data.

At step 540, the primary database server determines whether the primary database is being logically replicated to the logical replica database. If no logical replication is performed, then the process proceeds to step 580, and the primary database server returns to the client system the new LOB locator, which the client system may cache and request LOB data at any point of time in the future.

However, if, at step 540, it is determined that the primary database server is performing logical replication to the standby database, then the process proceeds to step 550. At step 550, the primary database server generates additional object metadata and associates the metadata with the LOB locator. For example, the association may be performed by extending the LOB locator to include the additional metadata. The additional metadata indicates that the LOB locator is generated during the logic replication and may additionally include a unique identifier for the LOB object. The primary database server may set a flag within the LOB locator that indicates that the LOB locator was generated during/after the logical replication. Additionally, or alternatively, the process may generate a checksum for the modified LOB data and associate with and/or include the checksum in the new LOB locator so the checksum is available with the future client request(s). Additional metadata may also include the owner's user identifier and the database identifier.

In the implementation in which the LOB locator contains the SCN of the generation of the LOB locator, at step 560, the primary database server replaces the SCN with the logical switchover SCN. The modification SCN of the LOB data on the primary database is nonexistent on the logical replica database and, thus, is invalid at the standby database server. For the LOB locator not to be rejected by the standby database server only for invalid SCN, the primary database server's SCN is replaced with the switchover SCN, which is valid on the standby database server, before returning the LOB locator to the client system.

At step 580, the primary database server returns the LOB locator to the client system. The client system may cache the LOB locator and use it at any time in the future. The techniques described herein reduce the possibility for the LOB locator to be found invalid.

In an implementation, when a database server receives a client request to retrieve the object for an object reference, the database server checks whether additional object metadata exists for the object reference. Regardless of whether this is a standby database server or primary database server, if the database server determines that no additional object metadata exists or the additional object metadata indicates that the object has not been modified during the logical replication, the database server may proceed with the object request operation with the object reference. The object is successfully returned to the client as there has not been any physical address change for the object reference during the logical replication.

Otherwise, if the additional object metadata exists, then the database server determines whether the object reference is still valid or not. If a session failover has occurred to the logical replicate, the object reference is rejected. However, not all object references are rejected by the database server if the object has been modified during the logical application. For example, if the object modification request still exists in the replay context, the object modification operation is replayed on the logical replica database server. Such a replay generates a new object reference for the client system, which does not include additional metadata that indicates that the object was modified during the replication. Accordingly, when the new object reference is presented to the standby database server by the client system, the standby database server may successfully retrieve the object using this new object reference.

Figure 6:
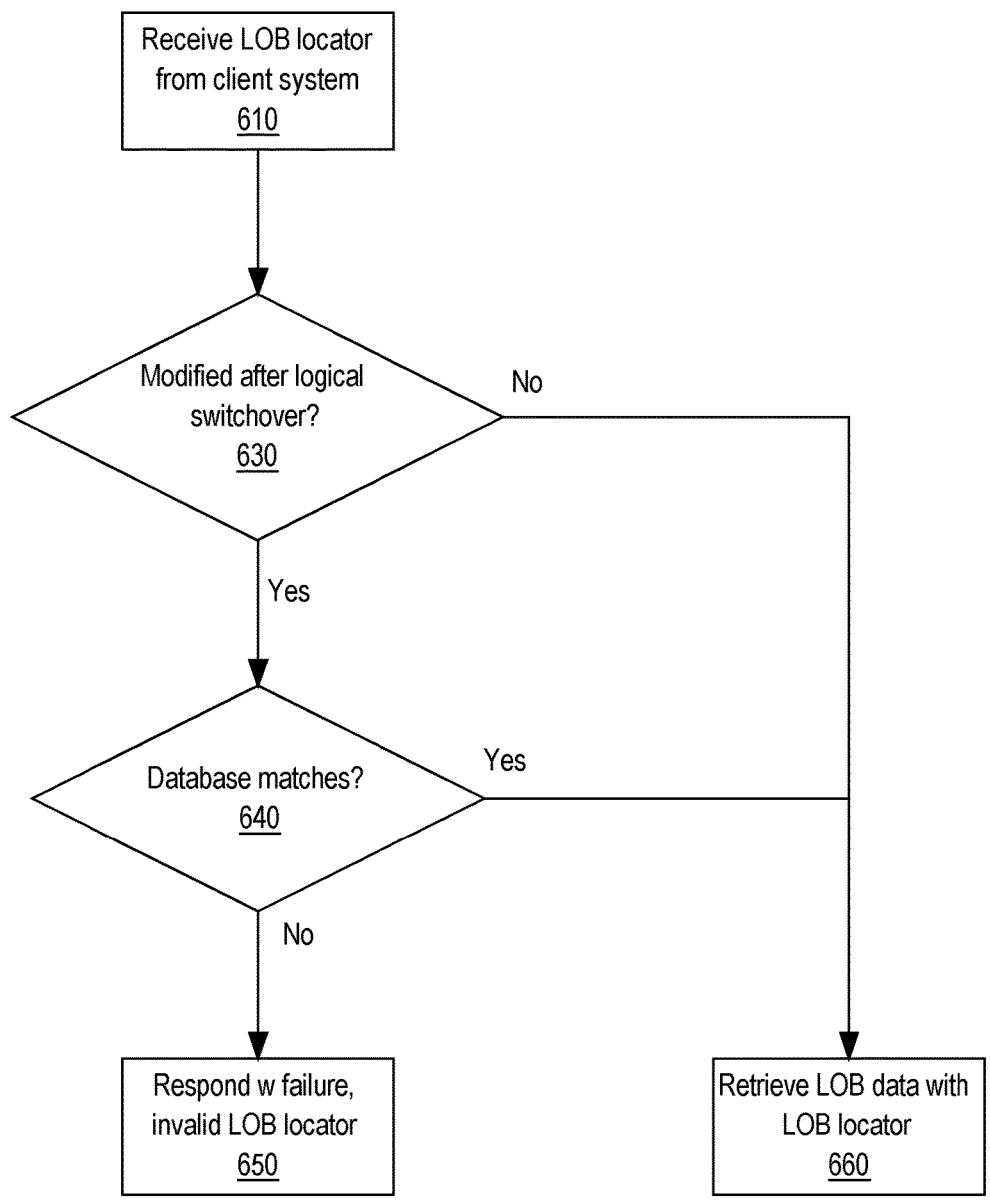
FIG. 6 is a block diagram that illustrates a process for retrieving LOB data with LOB locators, in an implementation.

FIG. 6 is a block diagram that illustrates a process for retrieving LOB data with LOB locators, in an implementation. At step 610, the database server receives a LOB locator from the client system to retrieve LOB data from the database. The database may be the original primary database, the logical replica database or any incarnation thereof.

At step 630, the database server determines whether the metadata exists and if such metadata indicates modification of the LOB data after the switchover from the physical standby database to the logical replica database has occurred. The logical replication to the logical replica database from the primary database may be initiated at that point or soon after.

When the LOB locator has no flag indicating that the LOB locator was generated after the logical switchover, then the LOB object for the LOB locator has already been physically replicated prior to the incarnation of the logical replica database server and, thus, should have the same physical properties including the physical memory address. If no additional metadata is identified for the LOB locator at step 630, the process proceeds to 660, and the object reference is successfully used by the standby database server to retrieve the object. No additional metadata indicates that the object reference was generated prior to the logical replication and, thus, has been physically replicated to the logical replica database.

If the LOB data has been modified during the logical replication, then the request is to be rejected if the request is received by the standby database server of the logical replica database or any incarnation thereof. However, if the request is received before the failover to the logical replica database, the LOB locator is still valid, even if the locator has been generated during the logical replication.

To match the receiving/target database with the originating database of the LOB locator, the database server retrieves the identifier (hashed-based or plain) of the originating database from the metadata of the LOB locator and compares it to the target database at step 640. If mismatched, then the process proceeds to step 650, and the database server rejects the LOB locator. Such a rejection of an LOB locator during the failover to the logical replica database may cause the failover to be aborted, and the client system has to handle the disconnection.

Otherwise, if, at step 630, the database server determines that no indication exists that the LOB data that is associated with the LOB locator has been modified after the logical replica database was spawned and/or during the logical replication, the process proceeds to step 660. Similarly, if, at step 640, the incarnation of the originating database of the LOB locator matches the target database, then the process also proceeds to step 660. At step 660, the database server successfully retrieves the LOB data using the LOB locator.

Validation Across Database Software Versions

When a session fails over to the new database, the client system may carry over validation information from the previous database to validate the reconstruction of the state and data on the new target database. Because the failover happens across databases that run different versions of the database management system, the validation information on the client side has been generated by a version of the database server that is different from the new target database server.

Accordingly, although the validation should successfully pass, the validation may fail because different techniques may be used on the new target database server to generate the corresponding validation information due to the version change. The generated information may not match the original validation information stored on the client system and, thus, wrongfully indicate failure in the failover.

To prevent such false failures in failover, the standby database server to which the session fails over identifies the original database management software version of the primary database server, in an implementation. The original database software version information may be derived from the original validation information itself, retrieved from the client replay context or from the local data file(s), in which the standby database server stored the version information prior to upgrading to the new version.

In such an implementation, the standby server generates its validation information based on the original database version. For example, the standby server selects the algorithm for generating the validation information based on the original database version and executes the algorithm to generate the validation information the same way as the primary database server has done. Using the standby database server may compare the version-specific version information with the obtained validation information to accurately determine whether the validation passes or fails.

One example of validation information is a session state signature. When a session fails over to the standby database server, the standby database server verifies whether its regenerated session state is the same as the session state that used to be on the primary database. The validation algorithm, as well as used session attributes, may be different from one database software version to another (especially across major versions). For that reason, the standby database server may determine the database version of the session state signature(s) in the replay context and, when requesting to generate its own standby session signatures for the failover session, provide the database software information for the signature generation. The signature(s) of the standby database are then generated using the same session attributes and the same signature algorithm as for the original signatures. Accordingly, the validation of the failover session state is not dependent on the manner in which the original and new session state signatures were generated but rather on whether the session states really match.

Another example of validation information is a checksum of SQL results. The standby database server may validate whether the modification of the data on the standby database server matches the results of the modification of the data on the primary database server for a failover session. A checksum generated based on modified data may be used. However, the checksum algorithm may vary between (major) database software versions. Accordingly, similar to the session state signatures, the standby database server identifies the primary database's version information. Based on the version information, the standby database server selects the checksum algorithm to generate the checksum for the modified object on the standby database. The comparison of the generated checksum with the original checksum accurately indicates whether the object modification matches the failover session.

Database Management System Overview

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In implementations, the databases may be structured as key-value stores (e.g., NoSQL or JSON) where different database objects may represent different data structures. Key-values and associated objects can be referenced, for example, by utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one implementation, a database language for expressing the query is the Structured Query Language (SQL). There are many different versions of SQL; some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the implementations of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an implementation, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 7:
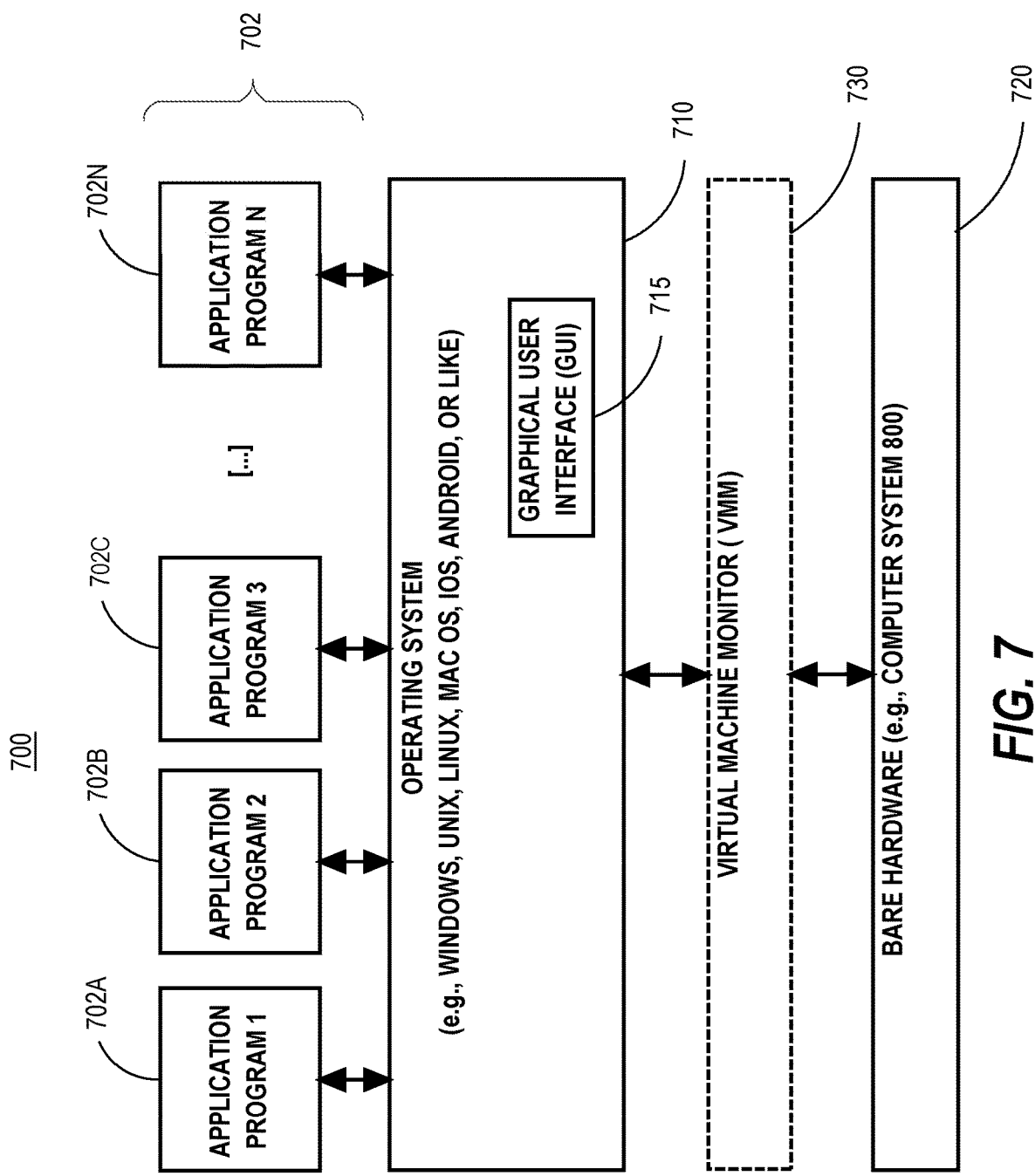
FIG. 7 is a block diagram of a basic software system, in one or more implementations.
Figure 8:
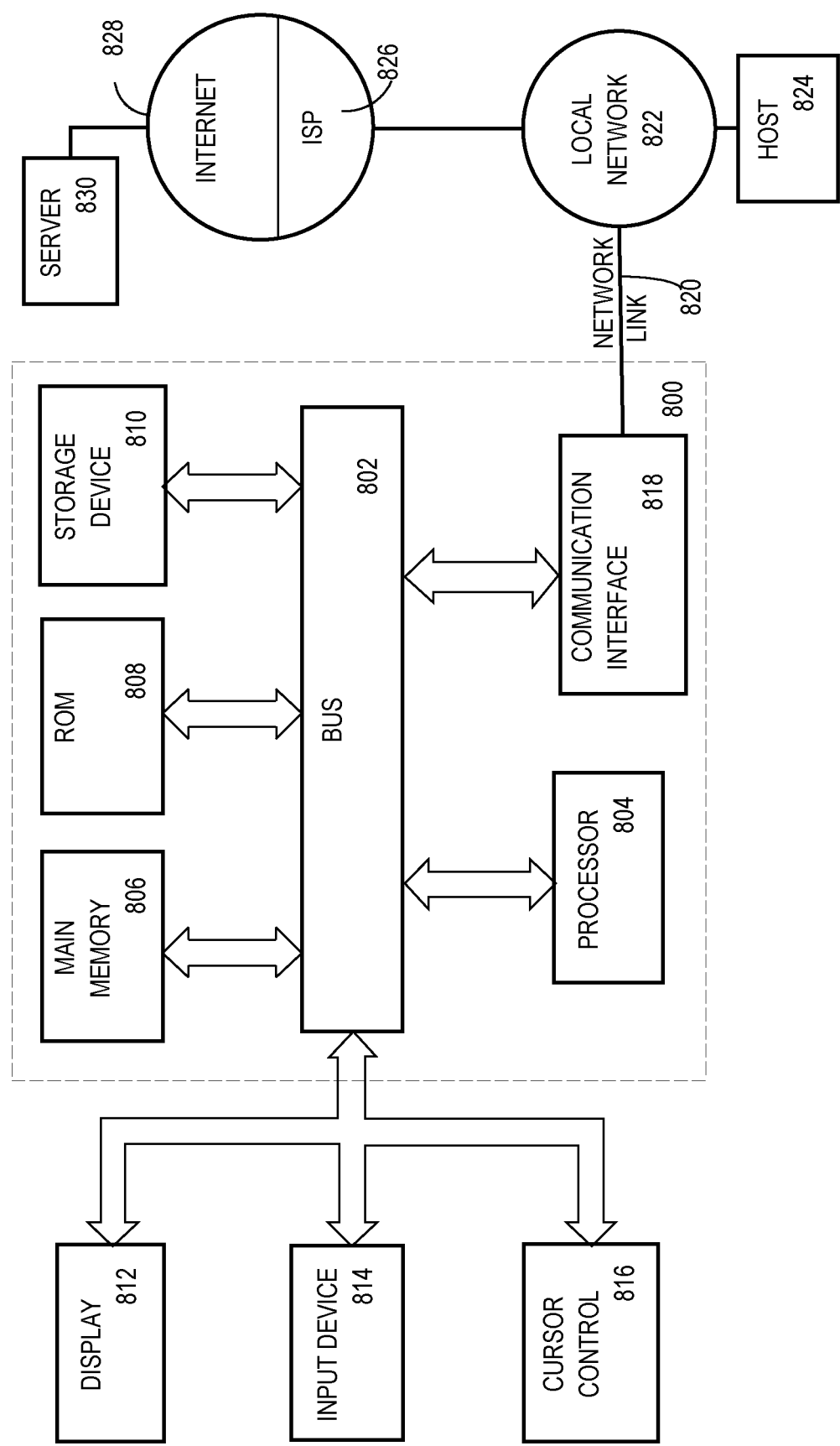
FIG. 8 is a block diagram that illustrates a computer system upon which the session migration techniques described herein may be implemented.

FIG. 7 is a block diagram of a basic software system 700 that may be employed for controlling the operation of computing system 800 of FIG. 8. Software system 700 and its components, including their connections, relationships, and functions, are meant to be exemplary only, and not meant to limit implementations of the example implementation(s). Other software systems suitable for implementing the example implementation(s) may have different components, including components with different connections, relationships, and functions.

Software system 700 is provided for directing the operation of computing system 800. Software system 700, which may be stored in system memory (RAM) 806 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs represented as 702A, 702B, 702C . . . 702N, may be "loaded" (e.g., transferred from fixed storage 810 into memory 806) for execution by the system 700. The applications or other software intended for use on computer system 800 may also be stored as a set of downloadable computer-executable instructions, for example, for downloading and installation from an Internet location (e.g., a Web server, an app store, or another online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example implementation(s). The example implementation(s), however, are not necessarily limited to any particular computing environment or computing device configuration. Instead, the example implementation(s) may be implemented in any type of system architecture or processing environment that one skilled in the art, in light of this disclosure, would understand as capable of supporting the features and functions of the example implementation(s) presented herein.

Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an implementation of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or another dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read-only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one implementation, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal, and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826, in turn, provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, from a client system, a request to establish a new session at a logical replica database of a standby database server;
wherein the logical replica database is kept in synch with data of a primary database through logical replication of changes to the primary database;
wherein the new session is a failover session of an original session at the primary database of a primary database server;
prior to receiving the request to establish the new session:
the primary database server receiving a set of one or more commands in the original session, which, if completed in the original session, would cause performance of:
a first server operation that commits a transaction that includes the set of one or more commands,
a second server operation that generates and executes an SQL-based command for storing a commit-indication that indicates that the transaction was committed,
wherein the commit-indication is not stored until after the first server operation has committed the transaction and completed the set of commands,
replicating and executing the SQL-based command on the logical replica database, and thereby storing the commit-indication that indicates that the transaction was committed on the logical replica database;
receiving by the standby database server in the new session, from the client system, a request for an outcome of the set of one or more commands that were previously sent by the client system in the original session;
wherein the request, for the outcome, received by the standby database server includes the commit-indication to identify the set of one or more commands;
in response to the request for the outcome, determining, by the standby database server, based, at least in part, on existence of the commit-indication on the logical replica databases, whether the set of one or more commands has committed on the primary database and, thereby, successfully replicated to the logical replica database.

2. The method of claim 1, further comprising:
determining that the transaction has not committed, and
in response to determining that the transaction has not committed, executing the transaction in the new session;
wherein the transaction is committed at most once across both the original session and the new session.

3. The method of claim 1, further comprising:
determining that the transaction has committed; and
in response to determining that the transaction has committed, skipping executing the transaction in the new session;
wherein the transaction is committed at most once across both the original session and the new session.

4. The method of claim 1, wherein a primary-specific object-level identifier is stored on the primary database in association with the commit-indication that indicates that the transaction was committed, and the method further comprising:
determining a standby-specific object-level identifier that corresponds to the primary-specific object-level identifier;
storing, in the logical replica database, the commit-indication in association with the standby-specific object-level identifier rather than the primary-specific object-level identifier;
receiving by the standby database server in the new session, from the client system, the request for the outcome of the set of one or more commands that were previously sent by the client system in the original session;
wherein the request, for the outcome, is associated with the standby-specific object-level identifier to identify the set of one or more commands;
in response to the request for the outcome, determining, by the standby database server, based, at least in part, on the standby-specific object-level identifier, whether the set of one or more commands has committed on the primary database and, thereby, successfully replicated to the logical replica database.

5. The method of claim 1, further comprising:
prior to receiving a request to establish the original session, receiving, at the primary database, a request to execute particular one or more commands that cause generating a primary-specific object-level identifier at the primary database and storing logical data in association with the primary-specific object-level identifier on the primary database;
receiving, at the logical replica database, a replication request to execute the particular one or more commands that causes generating a standby-specific object-level identifier different from the primary-specific object-level identifier and storing the standby-specific object-level identifier in association with the logical data on the logical replica database;
determining the standby-specific object-level identifier for the primary-specific object-level identifier based, at least in part, on the logical data;
prior to receiving the request to establish the new session and after receiving the request to establish the original session, replicating the commit-indication associated with the primary-specific object-level identifier to the standby database server, and
based, at least in part, on determining the standby-specific object-level identifier for the primary-specific object-level identifier, the replicating causing the standby database server to store the commit-indication in association with the standby-specific object-level identifier rather than the primary-specific object-level identifier.

6. The method of claim 5, wherein in the logical data is a username, the standby-specific object-level identifier is a user identifier generated by the standby database server, and the primary-specific object-level identifier is a user identifier generated by the primary database server.

7. The method of claim 1, further comprising:
retrieving particular identifying information of the logical replica database from the client system;

comparing the particular identifying information of the logical replica database with local identifying information of the logical replica database;

based, at least in part, on the comparing the particular identifying information of the logical replica database with the local identifying information of the logical replica database, determining whether to proceed with failover of session from the primary database to the logical replica database.

8. The method of claim 1, further comprising:

retrieving an incarnation timestamp of the logical replica database;

comparing the incarnation timestamp of the logical replica database with a current timestamp of the logical replica database;

based, at least in part, comparing the incarnation timestamp of the logical replica database with the current timestamp of the logical replica database, determining whether to proceed with the new session as a failover session with the logical replica database.

9. The method of claim 1, further comprising:

receiving, by the standby database server in the new session, a query to execute at a particular timestamp of the logical replica database;

determining that the particular timestamp is before a switchover timestamp at which the logical replica database was switched over to from the primary database;

replacing the particular timestamp in the query with a timestamp of the logical replica database at which the logical replica database was switched over to.

10. The method of claim 1, further comprising:

receiving, by the primary database server in the original session, a request to record in a replay context of the client system a query to replay at a particular timestamp of the primary database;

determining that the particular timestamp is before a switchover timestamp at which the logical replica database was switched over to from the primary database;

replacing the particular timestamp in the query with the switchover timestamp of the logical replica database;

causing the client system to store the query in the replay context with the switchover timestamp.

11. One or more non-transitory storage media storing sequences of instructions that, when executed by one or more computing devices, cause:

receiving, from a client system, a request to establish a new session at a logical replica database of a standby database server;

wherein the logical replica database is kept in synch with data of a primary database through logical replication of changes to the primary database;

wherein the new session is a failover session of an original session at the primary database of a primary database server;

prior to receiving the request to establish the new session:

the primary database server receiving a set of one or more commands in the original session, which, if completed in the original session, would cause performance of:

a first server operation that commits a transaction that includes the set of one or more commands, a second server operation that generates and executes an SQL-based command for storing a commit-indication that indicates that the transaction was committed, wherein the commit-indication is not stored until after the first server operation has committed the transaction and completed the set of commands, replicating and executing the SQL-based command on the logical replica database, and thereby storing the commit-indication that indicates that the transaction was committed on the logical replica database;

receiving by the standby database server in the new session, from the client system, a request for an outcome of the set of one or more commands that were previously sent by the client system in the original session;

wherein the request, for the outcome, received by the standby database server includes the commit-indication to identify the set of one or more commands;

in response to the request for the outcome, determining, by the standby database server, based, at least in part, on existence of the commit-indication on the logical replica databases, whether the set of one or more commands has committed on the primary database and, thereby, successfully replicated to the logical replica database.

12. The one or more non-transitory storage media of claim 11, wherein the sequences of instructions include instructions that, when executed by one or more computing devices, cause:

determining that the transaction has not committed, and in response to determining that the transaction has not committed, executing the transaction in the new session;

wherein the transaction is committed at most once across both the original session and the new session.

13. The one or more non-transitory storage media of claim 11, wherein the sequences of instructions include instructions that, when executed by one or more computing devices, cause:

determining that the transaction has committed; and in response to determining that the transaction has committed, skipping executing the transaction in the new session;

wherein the transaction is committed at most once across both the original session and the new session.

14. The one or more non-transitory storage media of claim 11, wherein a primary-specific object-level identifier is stored on the primary database in association with the commit-indication that indicates that the transaction was committed, and wherein the sequences of instructions include instructions that, when executed by one or more computing devices, cause:

determining a standby-specific object-level identifier that corresponds to the primary-specific object-level identifier;

storing, in the logical replica database, the commit-indication in association with the standby-specific object-level identifier rather than the primary-specific object-level identifier;

receiving by the standby database server in the new session, from the client system, the request for the outcome of the set of one or more commands that were previously sent by the client system in the original session;

wherein the request, for the outcome, is associated with the standby-specific object-level identifier to identify the set of one or more commands;

in response to the request for the outcome, determining, by the standby database server, based, at least in part, on the standby-specific object-level identifier, whether the set of one or more commands has committed on the primary database and, thereby, successfully replicated to the logical replica database.

15. The one or more non-transitory storage media of claim 11, wherein the sequences of instructions include instructions that, when executed by one or more computing devices, cause:
   prior to receiving a request to establish the original session, receiving, at the primary database, a request to execute particular one or more commands that cause generating a primary-specific object-level identifier at the primary database and storing logical data in association with the primary-specific object-level identifier on the primary database;
   receiving, at the logical replica database, a replication request to execute the particular one or more commands that causes generating a standby-specific object-level identifier different from the primary-specific object-level identifier and storing the standby-specific object-level identifier in association with the logical data on the logical replica database;
   determining the standby-specific object-level identifier for the primary-specific object-level identifier based, at least in part, on the logical data;
   prior to receiving the request to establish the new session and after receiving the request to establish the original session, replicating the commit-indication associated with the primary-specific object-level identifier to the standby database server, and
      based, at least in part, on determining the standby-specific object-level identifier for the primary-specific object-level identifier, the replicating causing the standby database server to store the commit-indication in association with the standby-specific object-level identifier rather than the primary-specific object-level identifier.

16. The one or more non-transitory storage media of claim 15, wherein the logical data is a username, the standby-specific object-level identifier is a user identifier generated by the standby database server, and the primary-specific object-level identifier is a user identifier generated by the primary database server.

17. The one or more non-transitory storage media of claim 11, wherein the sequences of instructions include instructions that, when executed by one or more computing devices, cause:
   retrieving particular identifying information of the logical replica database from the client system;
   comparing the particular identifying information of the logical replica database with local identifying information of the logical replica database;
   based, at least in part, on the comparing the particular identifying information of the logical replica database with the local identifying information of the logical replica database, determining whether to proceed with failover of session from the primary database to the logical replica database.

18. The one or more non-transitory storage media of claim 11, wherein the sequences of instructions include instructions that, when executed by one or more computing devices, cause:
   retrieving an incarnation timestamp of the logical replica database;
   comparing the incarnation timestamp of the logical replica database with a current timestamp of the logical replica database;
   based, at least in part, comparing the incarnation timestamp of the logical replica database with the current timestamp of the logical replica database, determining whether to proceed with the new session as a failover session with the logical replica database.

19. The one or more non-transitory storage media of claim 11, wherein the sequences of instructions include instructions that, when executed by one or more computing devices, cause:
   receiving, by the standby database server in the new session, a query to execute at a particular timestamp of the logical replica database;
   determining that the particular timestamp is before a switchover timestamp at which the logical replica database was switched over to from the primary database;
   replacing the particular timestamp in the query with a timestamp of the logical replica database at which the logical replica database was switched over to.

20. The one or more non-transitory storage media of claim 11, wherein the sequences of instructions include instructions that, when executed by one or more computing devices, cause:
   receiving, by the primary database server in the original session, a request to record in a replay context of the client system a query to replay at a particular timestamp of the primary database;
   determining that the particular timestamp is before a switchover timestamp at which the logical replica database was switched over to from the primary database;
   replacing the particular timestamp in the query with the switchover timestamp of the logical replica database;
   causing the client system to store the query in the replay context with the switchover timestamp.

* * * * *

UNITED STATES PATENT AND TRADEMARK OFFICE
CERTIFICATE OF CORRECTION

PATENT NO. : 12,204,558 B2
APPLICATION NO. : 18/379684
DATED : January 21, 2025
INVENTOR(S) : Colrain et al.

It is certified that error appears in the above-identified patent and that said Letters Patent is hereby corrected as shown below:

On the Title Page

On page 3, Column 1, under item (56) Other Publications, Line 18, delete ""MalicioClient" and insert -- "MaliciousClient --, therefor.

In the Specification

In Column 2, Line 9, delete "version," and insert -- version. --, therefor.

In Column 18, Line 4, after "the" insert -- logical replica database. --, therefor.

In Column 18, Lines 4-11, after "the" delete "Because allowing the commit to proceed blocks later attempts to commit a transaction using the same LTXID, the replicated transaction history table of the primary database on the logical replica database provides information on the result of the commit in the session before failover. An LTXID may be stored or updated at commit time. After committing, a copy of the next LTXID that the server plans to use for that session is returned to the client." and insert the same on Column 18, Line 12, above "After" as a continuation of new paragraph.

In Column 30, Line 49, delete "system" and insert -- system. --, therefor.

Signed and Sealed this
Eighth Day of April, 2025

Coke Morgan Stewart
*Acting Director of the United States Patent and Trademark Office*